(12) United States Patent
Oyague

(10) Patent No.: US 8,723,402 B2
(45) Date of Patent: *May 13, 2014

(54) STRUCTURE FOR AN ELECTROMAGNETIC MACHINE HAVING COMPRESSION AND TENSION MEMBERS

(71) Applicant: Boulder Wind Power, Inc., Louisville, CO (US)

(72) Inventor: Francisco Javier Oyague, Denver, CO (US)

(73) Assignee: Boudler Wind Power, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/692,089

(22) Filed: Dec. 3, 2012

(65) Prior Publication Data

US 2014/0028149 A1    Jan. 30, 2014

Related U.S. Application Data

(63) Continuation of application No. 13/561,433, filed on Jul. 30, 2012, now Pat. No. 8,339,019.

(51) Int. Cl.
*H02K 1/30* (2006.01)
*H02K 1/22* (2006.01)

(52) U.S. Cl.
USPC .......................... 310/420; 310/261.1; 310/267

(58) Field of Classification Search
USPC ........... 310/74, 265, 267, 420–423; 74/572.1, 74/572.11
See application file for complete search history.

(56) References Cited

U.S. PATENT DOCUMENTS

| 565,378 | A | 8/1896 | Cobb |
| 670,388 | A | 3/1901 | Howland-Sherman |
| 734,731 | A | 7/1903 | Miller |
| 986,978 | A | 3/1911 | Heine |
| 1,422,414 | A | 7/1922 | Burke |
| 1,433,435 | A | 10/1922 | Horn |
| 1,817,054 | A | 8/1931 | Baudry |
| 2,792,505 | A | 5/1957 | Baudry |
| 3,046,426 | A | 7/1962 | Sven |
| 3,271,607 | A | 9/1966 | Barney |
| 3,793,530 | A | 2/1974 | Carter |
| 4,128,780 | A | 12/1978 | Sonobe |

(Continued)

FOREIGN PATENT DOCUMENTS

DE    117986    7/1900
EP    1 732 011 A1    12/2006

(Continued)

*Primary Examiner* — Burton Mullins
(74) *Attorney, Agent, or Firm* — Cooley LLP

(57) ABSTRACT

A structure of an electromagnetic machine includes an outer support member configured to support a conductive winding or a magnet. The structure further includes an inner support member, a first elongate compression member, a second elongate compression member, and an elongate tension member. The first elongate compression member and the second elongate compression member each include a first end portion coupled to the outer support member and a second end portion coupled to the inner support member to resist radial and axial deflection of the outer support member relative inner support member. The elongate tension member includes a first end portion coupled to the first compression member and a second end portion coupled to one of the inner support or the second elongate compression member to resist rotational deflection of the outer support member relative to the inner support member.

21 Claims, 11 Drawing Sheets

(56) References Cited

U.S. PATENT DOCUMENTS

| | | |
|---|---|---|
| 4,168,439 A | 9/1979 | Palma |
| 4,242,628 A | 12/1980 | Mohan et al. |
| 4,261,441 A | 4/1981 | Wood |
| 4,281,965 A | 8/1981 | Stjernjolm |
| 4,291,233 A | 9/1981 | Kirschbaum |
| 4,292,532 A | 9/1981 | Leroux |
| 4,318,019 A | 3/1982 | Teasley et al. |
| 4,327,303 A | 4/1982 | Jacobsen |
| 4,350,895 A | 9/1982 | Cook |
| 4,417,853 A | 11/1983 | Cook |
| 4,418,287 A | 11/1983 | Syverson |
| 4,720,640 A | 1/1988 | Anderson et al. |
| 4,906,060 A | 3/1990 | Claude |
| 4,970,404 A | 11/1990 | Barger |
| 4,992,920 A | 2/1991 | Davis |
| 4,994,684 A | 2/1991 | Lauw et al. |
| 5,028,804 A | 7/1991 | Lauw |
| 5,083,077 A | 1/1992 | Wallace et al. |
| 5,237,230 A | 8/1993 | Sugiyama et al. |
| 5,239,251 A | 8/1993 | Lauw |
| 5,260,617 A | 11/1993 | Leibowitz |
| 5,289,042 A | 2/1994 | Lis |
| 5,299,913 A | 4/1994 | Heidelberg |
| 5,315,159 A | 5/1994 | Gribnau |
| 5,370,711 A | 12/1994 | Audit et al. |
| 5,418,446 A | 5/1995 | Hallidy |
| 5,439,488 A | 8/1995 | Audit et al. |
| 5,506,453 A | 4/1996 | McCombs |
| 5,525,894 A | 6/1996 | Heller |
| 5,587,643 A | 12/1996 | Heller |
| 5,619,085 A | 4/1997 | Shramo |
| 5,783,894 A | 7/1998 | Wither |
| 5,798,631 A | 8/1998 | Spée et al. |
| 5,798,632 A | 8/1998 | Muljadi |
| 5,842,312 A | 12/1998 | Krumme et al. |
| 5,844,324 A | 12/1998 | Spriggle |
| 5,844,341 A | 12/1998 | Spooner et al. |
| 5,986,438 A | 11/1999 | Wallace et al. |
| 6,016,015 A | 1/2000 | Willard, Jr. |
| 6,064,123 A | 5/2000 | Gislason |
| 6,066,945 A | 5/2000 | Shimazu et al. |
| 6,072,303 A | 6/2000 | Nickoladze et al. |
| 6,097,104 A | 8/2000 | Russell |
| 6,153,944 A | 11/2000 | Clark |
| 6,157,147 A | 12/2000 | Lin |
| 6,160,336 A | 12/2000 | Baker et al. |
| 6,163,097 A | 12/2000 | Smith et al. |
| 6,163,137 A | 12/2000 | Wallace et al. |
| 6,172,429 B1 | 1/2001 | Russell |
| 6,177,735 B1 | 1/2001 | Chapman et al. |
| 6,215,199 B1 | 4/2001 | Lysenko et al. |
| 6,246,125 B1 | 6/2001 | Axtell |
| 6,249,058 B1 | 6/2001 | Rea |
| 6,278,197 B1 | 8/2001 | Appa |
| 6,285,090 B1 | 9/2001 | Brutsaert et al. |
| 6,327,994 B1 | 12/2001 | Labrador |
| 6,373,161 B1 | 4/2002 | Khalaf |
| 6,392,371 B1 | 5/2002 | Cheng et al. |
| 6,412,237 B1 | 7/2002 | Sahai |
| 6,426,580 B1 | 7/2002 | Ikeda et al. |
| 6,429,552 B2 | 8/2002 | Asao et al. |
| 6,452,287 B1 | 9/2002 | Looker |
| 6,476,513 B1 | 11/2002 | Gueorguiev |
| 6,476,534 B1 | 11/2002 | Vanderbeck et al. |
| 6,476,535 B1 | 11/2002 | Oohashi et al. |
| 6,483,199 B2 | 11/2002 | Umemoto et al. |
| 6,504,260 B1 | 1/2003 | Debleser |
| 6,522,045 B2 | 2/2003 | Ikeda et al. |
| 6,522,046 B2 | 2/2003 | Ikeda et al. |
| 6,541,877 B2 | 4/2003 | Kim et al. |
| 6,598,573 B2 | 7/2003 | Kobayashi |
| 6,641,367 B1 | 11/2003 | Van der Klippe |
| 6,661,146 B2 | 12/2003 | Oohashi et al. |
| 6,664,704 B2 | 12/2003 | Calley |
| 6,665,990 B1 | 12/2003 | Cody et al. |
| 6,781,276 B1 | 8/2004 | Stiesdal et al. |
| 6,794,777 B1 | 9/2004 | Fradella |
| 6,794,781 B2 | 9/2004 | Razzell et al. |
| 6,798,082 B1 | 9/2004 | Chen |
| 6,800,956 B2 | 10/2004 | Bartlett |
| 6,814,493 B2 | 11/2004 | Wobben |
| 6,826,874 B2 | 12/2004 | Takeuchi et al. |
| 6,833,633 B2 | 12/2004 | Wobben |
| 6,836,028 B2 | 12/2004 | Northrup et al. |
| 6,841,892 B1 | 1/2005 | Le Nabour et al. |
| 6,844,656 B1 | 1/2005 | Larsen et al. |
| 6,849,965 B2 | 2/2005 | Le Nabour et al. |
| 6,853,094 B2 | 2/2005 | Feddersen et al. |
| 6,856,039 B2 | 2/2005 | Mikhail et al. |
| 6,876,176 B2 | 4/2005 | Stefanovic et al. |
| 6,891,302 B1 | 5/2005 | Gabrys |
| 6,897,577 B2 | 5/2005 | Weeber et al. |
| 6,903,466 B1 | 6/2005 | Mercier et al. |
| 6,909,211 B2 | 6/2005 | Ciciliani et al. |
| 6,911,741 B2 | 6/2005 | Pettersen et al. |
| 6,921,243 B2 | 7/2005 | Canini et al. |
| 6,929,671 B2 | 8/2005 | Kim et al. |
| 6,943,461 B2 | 9/2005 | Kaploun |
| 6,943,462 B2 | 9/2005 | Wobben |
| 6,943,478 B2 | 9/2005 | Zepp et al. |
| 6,954,004 B2 | 10/2005 | Skeist et al. |
| 6,965,187 B2 | 11/2005 | Neff |
| 6,984,897 B2 | 1/2006 | Skeist et al. |
| 7,004,724 B2 | 2/2006 | Pierce et al. |
| 7,011,598 B2 | 3/2006 | Flamang et al. |
| 7,019,413 B2 | 3/2006 | Kinoshita |
| 7,023,160 B2 | 4/2006 | Virtanen et al. |
| 7,042,109 B2 | 5/2006 | Gabrys |
| 7,042,110 B2 | 5/2006 | Mikhail et al. |
| 7,042,128 B2 | 5/2006 | Zepp et al. |
| 7,045,925 B2 | 5/2006 | Fräger et al. |
| 7,049,719 B2 | 5/2006 | Wobben |
| 7,061,133 B1 | 6/2006 | Leijon et al. |
| 7,075,192 B2 | 7/2006 | Bywaters et al. |
| 7,081,696 B2 | 7/2006 | Ritchey |
| 7,084,520 B2 | 8/2006 | Zambrano et al. |
| 7,088,029 B2 | 8/2006 | Hiramatsu |
| 7,098,551 B2 | 8/2006 | Wobben |
| 7,105,941 B2 | 9/2006 | Hua |
| 7,105,975 B2 | 9/2006 | Semones et al. |
| 7,109,599 B2 | 9/2006 | Watkins |
| 7,109,625 B1 | 9/2006 | Jore et al. |
| 7,126,235 B2 | 10/2006 | Bernhoff et al. |
| 7,135,952 B2 | 11/2006 | Harding |
| 7,154,191 B2 | 12/2006 | Jansen et al. |
| 7,154,192 B2 | 12/2006 | Jansen et al. |
| 7,154,193 B2 | 12/2006 | Jansen et al. |
| 7,166,984 B1 | 1/2007 | Jones et al. |
| 7,170,212 B2 | 1/2007 | Balson et al. |
| 7,180,204 B2 | 2/2007 | Grant et al. |
| 7,186,083 B2 | 3/2007 | Bayly |
| 7,190,085 B2 | 3/2007 | Moehlenkamp |
| 7,190,101 B2 | 3/2007 | Hirzel |
| 7,205,678 B2 | 4/2007 | Casazza et al. |
| 7,215,038 B2 | 5/2007 | Bacon |
| 7,230,361 B2 | 6/2007 | Hirzel |
| 7,231,743 B2 | 6/2007 | Takeuchi et al. |
| 7,245,037 B2 | 7/2007 | Ängquist et al. |
| 7,253,543 B2 | 8/2007 | Akiyama |
| 7,329,099 B2 | 2/2008 | Hartman |
| 7,332,837 B2 | 2/2008 | Ward et al. |
| 7,345,377 B2 | 3/2008 | Bacon |
| 7,348,705 B2 | 3/2008 | Cai et al. |
| 7,355,309 B2 | 4/2008 | Costin et al. |
| 7,358,624 B2 | 4/2008 | Bacon |
| 7,365,472 B2 | 4/2008 | Hiramatsu |
| 7,375,449 B2 | 5/2008 | Butterfield |
| 7,385,330 B2 | 6/2008 | Trzynadlowski et al. |
| 7,437,264 B2 | 10/2008 | Pierce et al. |
| 7,468,569 B2 | 12/2008 | Hirzel |
| 7,478,777 B2 | 1/2009 | Wobben |
| 7,482,720 B2 | 1/2009 | Gordon et al. |
| 7,538,446 B2 | 5/2009 | Bonnet |
| 7,592,766 B2 | 9/2009 | Patel et al. |

(56) References Cited

U.S. PATENT DOCUMENTS

| | | |
|---|---|---|
| 7,595,574 B2 | 9/2009 | Ritchey |
| 7,612,463 B2 | 11/2009 | Cullen et al. |
| 7,640,648 B1 | 1/2010 | Rittenhouse |
| 7,646,126 B2 | 1/2010 | Trzynadlowski et al. |
| 7,646,132 B2 | 1/2010 | Halstead |
| 7,646,178 B1 | 1/2010 | Fradella |
| 7,692,357 B2 | 4/2010 | Qu et al. |
| 7,710,081 B2 | 5/2010 | Saban et al. |
| 7,714,479 B2 | 5/2010 | Seneff et al. |
| 7,723,891 B2 | 5/2010 | Rittenhouse |
| 7,750,522 B2 | 7/2010 | Gizaw et al. |
| 7,781,932 B2 | 8/2010 | Jansen |
| 7,816,833 B2 | 10/2010 | Nair |
| 7,821,164 B2 | 10/2010 | Laskaris et al. |
| 7,825,532 B1 | 11/2010 | Barber |
| 7,888,839 B2 | 2/2011 | Gabrys et al. |
| 7,923,886 B2 | 4/2011 | Calley et al. |
| 8,115,348 B2 | 2/2012 | Hsu et al. |
| 8,178,992 B1 | 5/2012 | Meller |
| 8,339,019 B1 | 12/2012 | Oyague |
| 8,362,731 B2 | 1/2013 | Smith et al. |
| 2008/0088200 A1 | 4/2008 | Ritchey |
| 2009/0120401 A1* | 5/2009 | Dopke et al. ............... 123/192.1 |
| 2011/0193349 A1 | 8/2011 | Borgen et al. |
| 2011/0273048 A1 | 11/2011 | Jore et al. |
| 2012/0104894 A1 | 5/2012 | Van Den Bossche et al. |
| 2012/0200177 A1 | 8/2012 | Atkinson et al. |
| 2012/0262095 A1 | 10/2012 | Smith et al. |

FOREIGN PATENT DOCUMENTS

| | | |
|---|---|---|
| JP | 61-277336 | 12/1986 |
| JP | 2000-228839 | 8/2000 |
| WO | WO 2010/083054 | 7/2010 |

* cited by examiner

STRUCTURE FOR AN ELECTROMAGNETIC MACHINE HAVING COMPRESSION AND TENSION MEMBERS

CROSS-REFERENCE TO RELATED APPLICATIONS

This application is a continuation of U.S. patent application Ser. No. 13/561,433, entitled "Structure for an Electromagnetic Machine Having Compression and Tension Members," filed Jul. 30, 2012, the disclosure of which is incorporated herein by reference in its entirety.

BACKGROUND

Some embodiments described herein relate to electromagnetic machines and more particularly to structures for an electronic machine having tension and compression components.

Permanent magnet electromagnetic machines (referred to as "permanent magnet machines" or electromagnetic machines" herein) utilize magnetic flux from permanent magnets to convert mechanical energy to electrical energy or vice versa. Various types of permanent magnet machines are known, including axial flux machines, radial flux machines, and transverse flux machines, in which one component rotates about an axis or translates along an axis, either in a single direction or in two directions (e.g., reciprocating, with respect to another component). Such machines typically include windings to carry electric current through coils that interact with the flux from the magnets through relative movement between the magnets and the windings. In a common industrial application arrangement, the permanent magnets are mounted for movement (e.g., on a rotor or otherwise moving part) and the windings are mounted on a stationary part (e.g., on a stator or the like). Other configurations, typical for low power, inexpensive machines operated from a direct current source where the magnets are stationary and the machine's windings are part of the rotor (energized by a device known as a "commutator" with "brushes") are clearly also available, but will not be discussed in detail in the following text in the interest of brevity.

In an electric motor, for example, current is applied to the windings in the stator, causing the magnets (and therefore the rotor) to move relative to the windings, thus converting electrical energy into mechanical energy. In a generator, application of an external force to the generator's rotor causes the magnets to move relative to the windings, and the resulting generated voltage causes current to flow through the windings—thus converting mechanical energy into electrical energy. In an AC induction motor, the rotor is energized by electromagnetic induction produced by electromagnets that cause the rotor to move relative to the windings on the stator, which are connected directly to an AC power source and can create a rotating magnetic field when power is applied.

Surface mounted permanent magnet machines are a class of permanent magnet machines in which the magnets are mounted on a ferromagnetic structure, or backing, commonly referred to as a back iron. Such machines are generally the lowest cost and lightest weight permanent magnet machines, but they typically suffer from limitations in performance that can be traced to a variety of design concerns. One such design concern is the size of the air gap between the stator and the rotor, as the electromagnetic efficiency of such machines tends to improve as the air gap size is reduced. Maintaining a constant air gap size is also important, both to avoid a collision between the rotor and the stator and to avoid unwanted currents, flux effects, and other load-related losses caused by eccentricities in the air gap. Consistency in air gap size is typically achieved by ensuring that the machine's stator and rotor (and any supporting structure) are stiff enough to withstand expected outside forces during assembly and operation. Significant violations of air gap size, such as where the air gap is nearly closed or is closed altogether, can be dangerous or destructive to equipment and personnel, particularly if the air gap is compromised during operation of the electromagnetic machine.

As the size of an electromagnetic machine increases (e.g., as known in wind power generation), dependence on structural stiffness to ensure that a minimum air gap clearance is maintained can become costly and/or can affect the overall efficiency of the machine due to the weight of the required structure. For example, generators of direct drive wind turbines tend to be large in diameter, ring like structures capable of handling large amounts of torque at low revolutions per minute. Such generators typically rely on a very stiff structure in torsion, with equally stiff responses to forces applied in the radial and axial directions. Such an approach is even more prevalent in an iron core permanent magnet generator where a small air gap is competing with high attractive forces between the rotor and the iron core stator from the magnets.

In an air core permanent magnet machine having no attractive forces between the stator and the rotor, the structure of the machine can be softer and lighter. For example, the structure can be soft axially and angularly, but stiff in torsion (or azimuthally). In such an air core permanent magnet machine, it may be desirable to allow the generator outer support member to deform axially, while maintaining a desired amount of torsional stiffness and/or its resistance to axial, radial and/or rotational deflections. Thus, a need exists for improved apparatus and methods to increase the structural efficiency of an electromagnetic machine and/or improve the ability of the electromagnetic machine to resist deflection in a variety of different directions.

SUMMARY

Apparatus and methods for increasing the structural efficiency of a structure in an electromagnetic machine and/or increasing the structure's resistance to deflection are described herein. In some embodiments, a structure included in an electromagnetic machine includes an outer support member configured to support one of a conductive winding or a magnet. The structure further includes an inner support member, a first elongate compression member, a second elongate compression member, and an elongate tension member. The first elongate compression member and the second elongate compression member each include a first end portion coupled to the outer support member and a second end portion coupled to the inner support member and can resist radial and axial deflection of the outer support member relative inner support member. The elongate tension member includes a first end portion coupled to a portion of the first compression member and a second end portion coupled to the inner support or the second elongate compression member and can resist rotational deflection of the outer support member relative to the inner support member.

DETAILED DESCRIPTION

Figure 1:
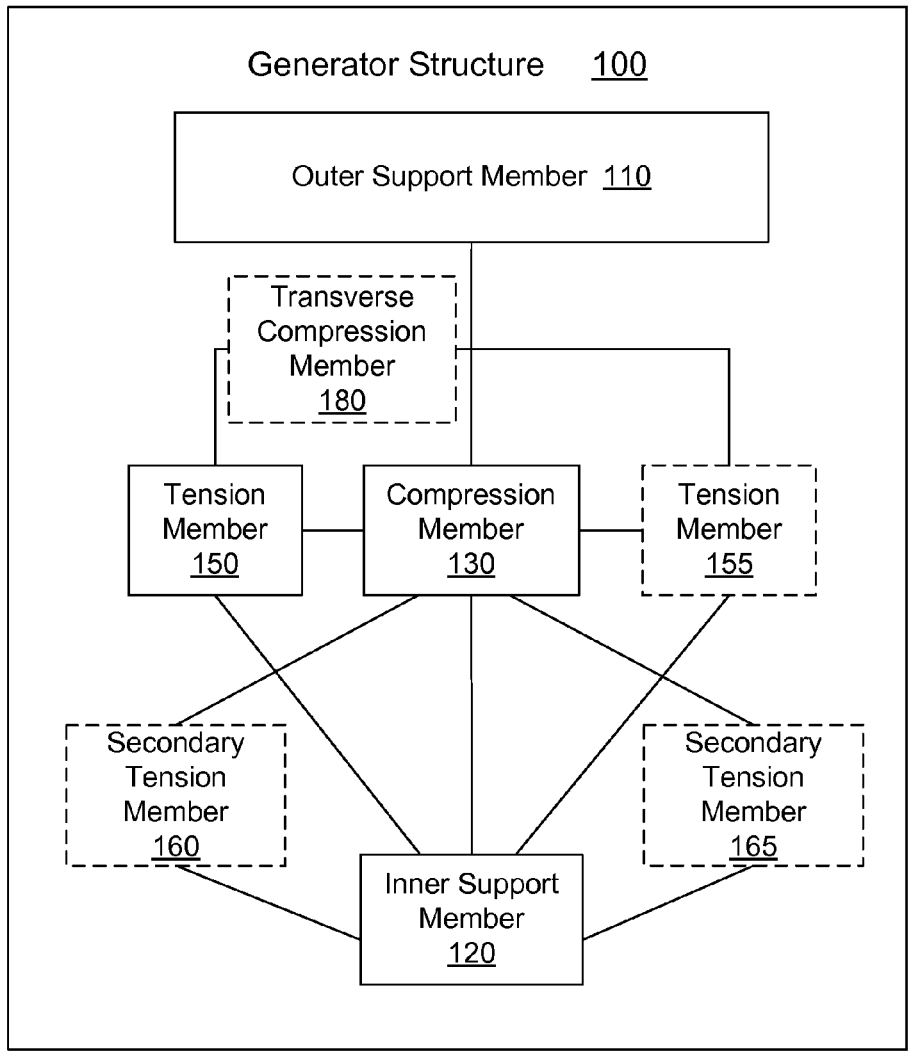
FIG. 1 is a schematic illustration of a generator structure according to an embodiment.

Apparatus and methods for increasing the structural efficiency of a structure in an electromagnetic machine and/or increasing the structure's resistance to deflection are described herein. For example, the structural efficiency can be increased by controlling and balancing the stiffness and/or mass of the various components of an electromagnetic machine. In some embodiments, a structure included in an electromagnetic machine includes an outer support member configured to support a conductive winding or a magnet. The structure further includes an inner support member, a first elongate compression member, a second elongate compression member, and an elongate tension member. The first elongate compression member and the second elongate compression member each include a first end portion coupled to the outer support member and a second end portion coupled to the inner support member and can resist radial and axial deflection of the outer support member relative inner support member. The elongate tension member includes a first end portion coupled to a portion of the first compression member and a second end portion coupled to one of the inner support or the second elongate compression member and can resist rotational deflection of the outer support member relative to the inner support member.

In some embodiments, a structure included in an electromagnetic machine includes an outer support member configured to support a conductive winding or a magnet. The structure further includes an inner support member having an axial width, an elongate compression member, and an elongate tension member. The elongate compression member includes a first end portion coupled to the outer support member and a second end portion coupled to the inner support member at a first location along the axial width. The elongate tension member includes a first end portion coupled to a portion of the elongate compression member and a second end portion coupled to the inner support member at a second location along the axial width, substantially different than the first location (e.g., the second end portion of the compression member and the second end portion of the tension member are spaced apart). The elongate compression member is configured to resist radial and rotational deflection of the outer support member relative to the inner support member. The elongate tension member is configured to resist axial deflection of the outer support member relative to the inner support member.

In some embodiments, a kit included in an electromagnetic machine includes an outer support member segment configured to support a conductive winding or a magnet. The kit further includes an inner support member, a first elongate compression member, and an elongate tension member. The first elongate compression member includes a first end portion coupled to the outer support member segment and a second end portion coupled to the inner support member to resist radial and axial deflection of the outer support member relative to the inner support member. The elongate tension member includes a first end portion coupled to a portion of the first elongate compression member and a second end portion coupled to one of the inner support member or a second elongate compression member to resist rotational deflection or axial deflection of the outer support member relative to the inner support member. At least the outer support member segment, the inner support member, the first elongate compression member, and the elongate tension member are configured to be coupled to form a structure included in an electromagnetic machine.

In some embodiments, a method includes coupling a first end of a first elongate compression member to an outer support member segment. The outer support member is configured to support a conductive winding or a magnet. The method further includes coupling a second end portion of the first elongate compression member to an inner support member. The first elongate compression member is configured to resist radial and axial deflection of the outer support member segment relative to the inner support member when coupled therebetween. The method also includes coupling a first end portion of an elongate tension member to a portion of the first compression member and coupling a second end portion of the elongate tension member to the inner support member or a second elongate compression member. The first elongate tension member is configured to resist one of rotational deflection or axial deflection of the outer support member segment relative to the inner support member.

Electromagnetic machines as described herein can be various types of synchronous and asynchronous machines, such as wound field synchronous machines, induction machines, doubly fed induction machines (presently commonly found in the wind energy conversion market), permanent magnet machines, including axial flux machines, radial flux machines, and transverse flux machines, in which one component rotates about an axis or translates along an axis, either in a single direction or in two directions (e.g., reciprocating, with respect to another component). Such machines typically include windings to carry electric current through coils that interact with the flux from the magnets through relative movement between the magnets and the windings. In a common industrial application arrangement (including the embodiments described herein), the permanent magnets are mounted for movement (e.g., on a rotor or otherwise moving part) and the windings are mounted on a stationary part (e.g., on a stator or the like). Some embodiments described herein focus on the permanent magnet variety of electromagnetic machines.

Although the embodiments described herein are described with reference to use within an electromagnetic machine (e.g., a rotor/stator assembly as described herein), it should be understood that the embodiments described herein can also be used within other machines or mechanisms. Furthermore, while described herein as being implemented in or on a stator assembly, it should be understood that the embodiments described herein can be implemented in or on a stator and/or rotor assembly.

Some embodiments described herein address axial field, air core, surface mounted permanent magnet generator rotor/ stator configurations; but it should be understood that the features, functions and methods described herein can be implemented in radial field, transverse field and embedded magnet configurations that also employ an air core stator configuration. Embodiments described herein can also be applied to electrically excited rotors commonly found in industrial and utility applications, such as wound field synchronous and devices common in the wind energy conversion industry known as "doubly fed induction generators." Furthermore, although the embodiments described herein refer to relatively large electromagnetic machines and/or components such as those found in wind power generators, it should be understood that the embodiments described herein are not meant to limit the scope or implementation of the apparatus and methods to that particular application.

As used herein, the term "axial deflection" can refer to, for example, the deflection (e.g., the bending, swaying, deforming, moving, etc.) of a component in a direction parallel to an axis of rotation of an electromagnetic machine. For example, in a generator having a rotor that is rotatably movable relative to a stator, a component of the stator can be said to have axial deflection when a portion of the component, is moved in a direction along an axis of rotation of the rotor.

As used herein, the term "rotational deflection" can refer to, for example, the deflection (e.g., the bending, swaying, deforming, moving, etc.) of a component in a direction of rotation of an electromagnetic machine. Such deflection can also be referred to as torsional deflection. In instances of large components and structures used in rotating flux machines (e.g., as seen in wind power generators) a small amount of deflection in the rotational direction can be considered tangential deflection.

As used herein, the term "radial deflection" can refer to, for example, deflection in a direction radially inward toward an axis of rotation of an electromagnetic machine or radially outward from the axis of rotation. For example, an outer support member of a stator or of a rotor can deflect in a radial direction toward an inner support member (e.g., hub) of the stator or rotor.

FIG. 1 is a schematic illustration of a generator structure 100, according to an embodiment. The generator structure 100 can be disposed in an electromagnetic machine, such as, for example, an axial flux, radial flux, or transverse flux machine. More specifically, the generator structure 100 described herein can be a stator assembly of, for example, an electric motor or an electric generator that includes a rotor assembly that can move relative to the stator assembly. For example, in some embodiments, the rotor assembly can include a rotor portion that rotates relative to the stator assembly (e.g., rotates with the direction of flux from rotor to stator generally in the axial or radial direction). The stator assembly can include or support, for example, an air core type stator without any ferromagnetic material to support a set of copper windings or conduct magnetic flux. An air core stator can include an annular array of stator segments (not shown) and one or more conductive windings (not shown) or one or more magnets (not shown). Each air core stator segment can include a printed circuit board sub-assembly (not shown), or other means known of structurally encapsulating the windings in non-ferromagnetic materials. In some embodiments, the printed circuit board sub assemblies can be similar to that described in U.S. Pat. No. 7,109,625, U.S. patent application Ser. No. 13/144,642, and International Application No. PCT/US2010/000112, each of the disclosures of which is incorporated herein by reference in its entirety. In some embodiments, a stator assembly can include or support a conventional iron-core construction arranged similarly to the air core concept described above.

In an alternative embodiment, the generator structure 100 can be a rotor assembly included in the electromagnetic machine. For example, as described above, a rotor assembly can include one or more rotor portions that move relative to a stator. In such embodiments where the generator structure 100 is a rotor assembly, the rotor assembly can include or support one or more magnetic flux generating members, such as, for example, magnets (e.g., a magnet pole assembly, or array of magnets) or windings (each not shown in FIG. 1). In some embodiments, the magnets can include an array of magnets and can be, for example, permanent magnets, electromagnets or a combination of both. For example, in an induction machine or wound field synchronous machine, the magnets are electromagnets. A winding can be, for example, as described above.

As shown in FIG. 1, the generator structure 100 (e.g., a stator assembly) includes an outer support member 110 and an inner support member 120. The outer support member 110 can be any suitable structure or assembly and is configured to support, for example, any number of printed circuit boards (referred to here as "PCBs") including or encapsulating a set of windings. The inner support member 120 can be any suitable structure. For example, in some embodiments, the inner support member 120 can be substantially annular and can be configured as a hub.

The generator structure 100 further includes at least an elongate compression member 130 and at least an elongate tension member 150. The elongate compression member 130 (also referred to herein as "compression member") can be any suitable shape, size, or configuration. For example, in some embodiments, the compression member 130 has a substantially I-shaped cross-section (e.g., the compression member 130 is an I-beam). In other embodiments, the compression member 130 is a substantially hollow, closed structure such as, for example, a box tubing (e.g., square or rectangular tubing). In still other embodiments, the compression member 130 can be substantially solid. In this manner, the compression member 130 can be formed from any suitable material such as a metal, metal alloy (e.g., steel or steel alloy), and/or composite. The compression member 130 can be coupled between the outer support member 110 and the inner support member 120. For example, the compression member 130 can include a first end coupled to the outer support member 110 and a second end coupled to the inner support member 120. For example, in some embodiments, the compression member 130 includes flanged end portions configured to be coupled to the outer support member 110 and the inner support member 120 (e.g., welded, bolted, riveted, pinned, adhered, or any combination thereof).

The elongate tension member 150 (also referred to herein as "tension member") can be any suitable shape, size, or configuration. In some embodiments, the tension member 150 can be a cable such as, for example, a steel braided cable or the like. In some embodiments, the tension member 150 includes a first end portion coupled to a portion of the compression member 130 and a second end portion coupled to the inner support member 120. In other embodiments, the first end portion of the tension member 150 can be coupled to a portion of the compression member 130 and the second end portion of the tension member 150 can be coupled to a portion of an adjacent compression member (not shown in FIG. 1).

As described above, in some embodiments, a rotor included in an electromagnetic machine can be configured to rotate relative to a stator (e.g., the generator structure 100) in response to an external force, for example, a rotational or torsional force transmitted through a drive shaft coupled to a wind powered turbine. In such embodiments, it can be desirable to include a stator (e.g., the generator structure 100) that is axially and angularly soft, but of a given stiffness, for example, such that the size of an air gap between the rotor and the stator can be controlled. Expanding further, in some embodiments, the outer support member 110 can be formed from a relatively soft and/or compliant material such that the outer support member 110 is urged to deflect during operation. For example, in some embodiments, the outer support member 110 can be urged to deflect by an air gap control mechanism such as those described in U.S. patent application Ser. No. 13/445,206, the disclosure of which is incorporated herein by reference in its entirety.

In this manner, the compression member 130 and the tension member 150 can be collectively configured to substantially increase the structural efficiency and/or increase resistance to deflection of the generator structure 100. For example, in some embodiments, the compression member 130 can be configured to resist axial, radial, and/or rotational deflection of the outer support member 110. In such embodiments, the cross-sectional shape of the compression member 130 can be configured to resist the deflection. In addition to or alternatively, a force can be applied to the compression member 130 such that the compression member 130 further resists axial and/or radial deflection, as described below. Thus, improved structural efficiency can be achieved by, for example, controlling and balancing stiffness and/or mass of various components of the generator structure 100.

In some embodiments, the tension member 150 can be selectively coupled to the inner support member 120 such that the tension within at least a portion of the tension member 150 can be selectively defined. For example, in some embodiments, the tension member 150 can be selectively coupled to the inner support member 120 via a slip ring or other clamping device configured to allow for the selective movement of the tension member 150 relative to the inner support member 120. In some embodiments, the tension member 150 can be coupled to the inner support member 120 such that a first end portion (e.g., the end portion selectively coupled to the inner support member 120) can be moved relative to the inner support member 120. Thus, with the opposite end portion (e.g., a second end portion) of the tension member 150 coupled to the compression member 130, the movement of the first end portion relative to the inner support member 120 places the tension member 150 in tension. In this manner, the tension member 150 can be configured to resist axial and/or rotational deflection of the outer support member 110 relative to the inner support member 120.

The compression member 130 can further be configured to exert a reaction force in response to the tension within the tension member 150. Expanding further, with the tension member 150 coupled to a portion of the compression member 130, the tension within the tension member 150 exerts a force on the compression member 130 such that the compression member 130 is placed in compression. In this manner, the compression member 130 and the tension member 150 can collectively resist deflection of the outer support member 110 in the axial, radial, and/or rotational direction.

As shown in FIG. 1, in some embodiments, the generator structure 100 can optionally include a second tension member 155. In such embodiments, the first tension member 150 can be disposed on a first side of the compression member 130 and the second tension member 150 can be disposed on a second side of the compression member 130. More specifically, in some embodiments, the first side of the compression member 130 can correspond to a side of the compression member 130 substantially opposite the direction of rotation of the rotor and the second side of the compression member 130 can correspond to a side substantially opposite the first side. In this manner, the first tension member 150 and the second tension member 155 can be selectively placed in tension to collectively resist the deflection of the outer support member 110. In some embodiments, the magnitude of tension within the first tension member 150 and the second tension member 155 is substantially similar. In other embodiments, the magnitude of tension within the first tension member 150 can be greater than the magnitude of tension within the second tension member 155. In this manner, the first tension member 150 can be configured to substantially resist the rotational deflection of the outer support member 110 relative to the inner support member 120.

In some embodiments, the first tension member 150 can be coupled to a first side of the compression member and coupled to the inner support member 120 at a first location along a width of the inner support member 120. Similarly, the second tension member 155 can be coupled to a second side of the compression member opposite the first side, and coupled to the inner support member 120 at a second location along the width of the inner support member 120. In this manner, the first tension member 150 and the second tension member 155 can be configured to resist axial and/or rotational deflection of the outer support member 110 relative to the inner support member 120 as described in more detail below with reference to specific embodiments.

In some embodiments, the generator structure 100 can include the first tension member 150 and/or the second tension member 155 and optionally include a secondary tension member 160. For example, in such embodiments, the secondary tension member 160 can include a first end portion coupled to the compression member 130 at a second location along a length of the compression member 130 different than the first location to which the first tension member 150 (or second tension member 155) is coupled, and a second end portion coupled to the inner support member 120 (or an adjacent compression member, as described above for tension member 150). For example, in some embodiments, the second location on the compression member 130 can be closer to the inner support member 120 than the first location (e.g., the location at which the tension member 150 or second tension member 155 are coupled). Thus, the secondary tension member 160 can be shorter than the tension member 150. In some embodiments, the generator structure 100 can include an additional secondary tension member 165 configured to be coupled to the compression member 130 and to the inner support member 120 (or an adjacent compression member 130). In this manner, the tension members 150 and 155 and the secondary tension members 160 and 165 can be selectively arranged to resist at least a portion of the axial and/or rotational deflection of the outer support member 110. Although two tension members 150 and 155 and two secondary tension members 160 and 165 are described as coupled to the compression member 130, it should be understood that more or less tension members and more or less secondary tension members can be included.

In some embodiments, the generator structure 100 can also include one or more transverse compression members 180. The transverse compression member(s) 180 can be coupled to the compression member 130 at any suitable position along a length of a longitudinal axis defined by the compression member 130. Furthermore, the transverse compression member(s) 180 can be coupled to the compression member 130 such that the transverse compression member(s) 180 extend at an angle relative to the compression member 130. For example, in some embodiments, the transverse compression member(s) 180 can extend perpendicularly from the compression member 130. In other embodiments, the transverse compression member(s) 180 can extend at a different angle relative to the compression member 130. In this manner, a transverse compression member 180 can be coupled to the compression member 130 and extend at an angle (e.g., perpendicular) to the longitudinal axis of the compression member 130 and be coupled to a portion of the tension member 150 (or tension member 155, secondary tension member 160, or secondary tension member 165). For example, in some embodiments, the transverse compression member 180 can be coupled to the compression member 130 and/or the tension member 150 with a coupling mechanism, such as, for example, a bolt, welding, a pivotal coupling, etc. In some embodiments, the transverse compression member 180 can include a coupling feature or features, such as, for example, a u-shaped coupler(s) that can engage the tension member 150 and/or compression member 130. The transverse compression member 180 can distribute and/or reconfigure the force applied to the compression member 130 by the tension member 150 (and/or tension members 155, 160, 165). Thus, the compression member 130, the tension member 150, and the transverse compression member(s) 180 can collectively resist the axial, radial, and/or rotational deflection of the outer support member 110 relative to the inner support member 120 depending on the particular configuration. Furthermore, the transverse compression member(s) 180 can be configured to resist buckling of the compression member 130.

A generator structure 100 can include various combinations of the different types of tension members (e.g., 150, 155, 160, 165) and compression members (e.g., 130, 180) to provide resistance to deflection and/or improved structural efficiency to the generator structure 100 depending on the particular structure and application. Thus, although specific embodiments are described herein having a subset of the various components, it should be understood that other configurations, combinations and sub-combinations can alternatively be included.

Figure 2:
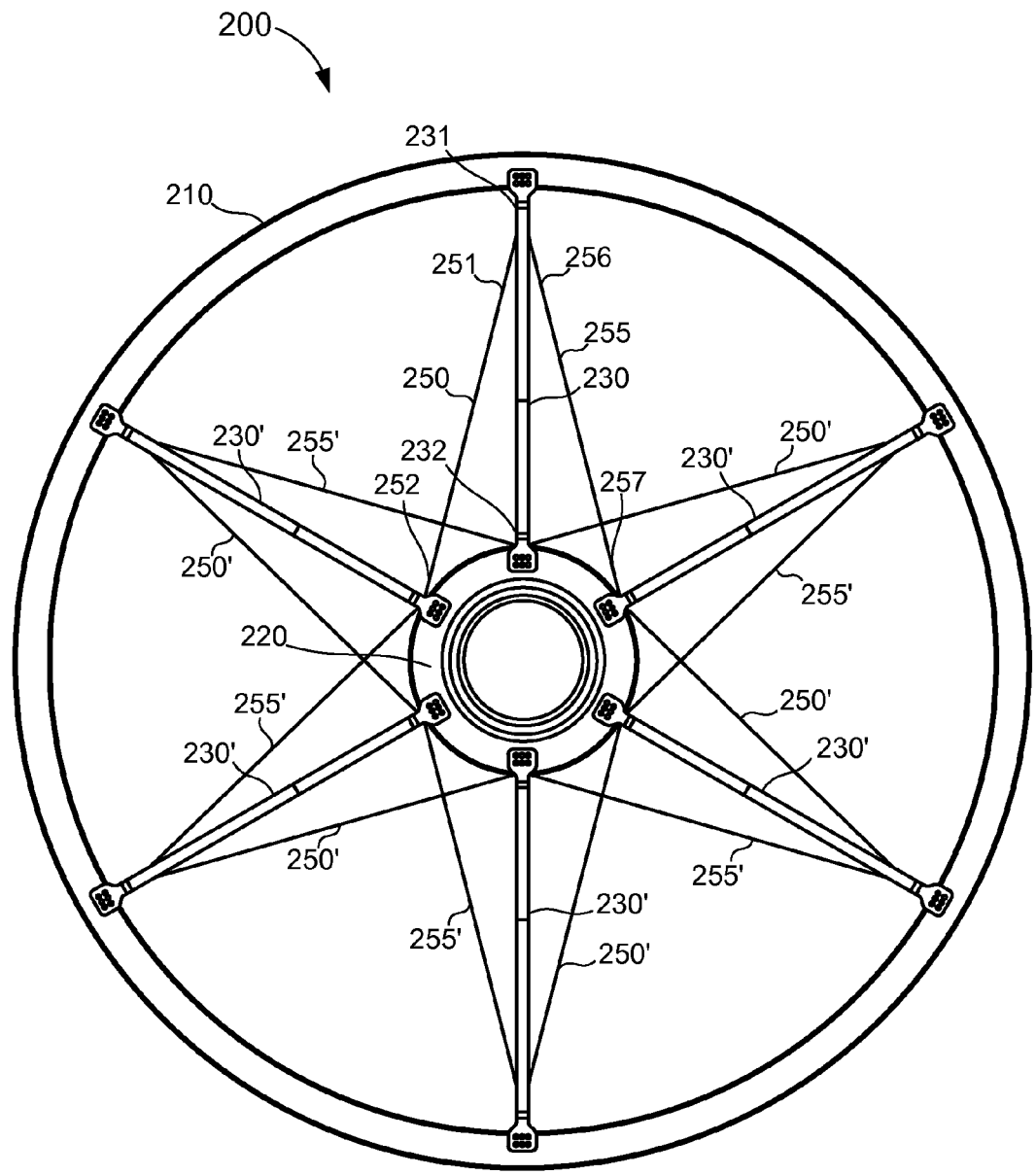
FIG. 2 is a front view illustration of a portion of a generator structure according to an embodiment.
Figure 3:
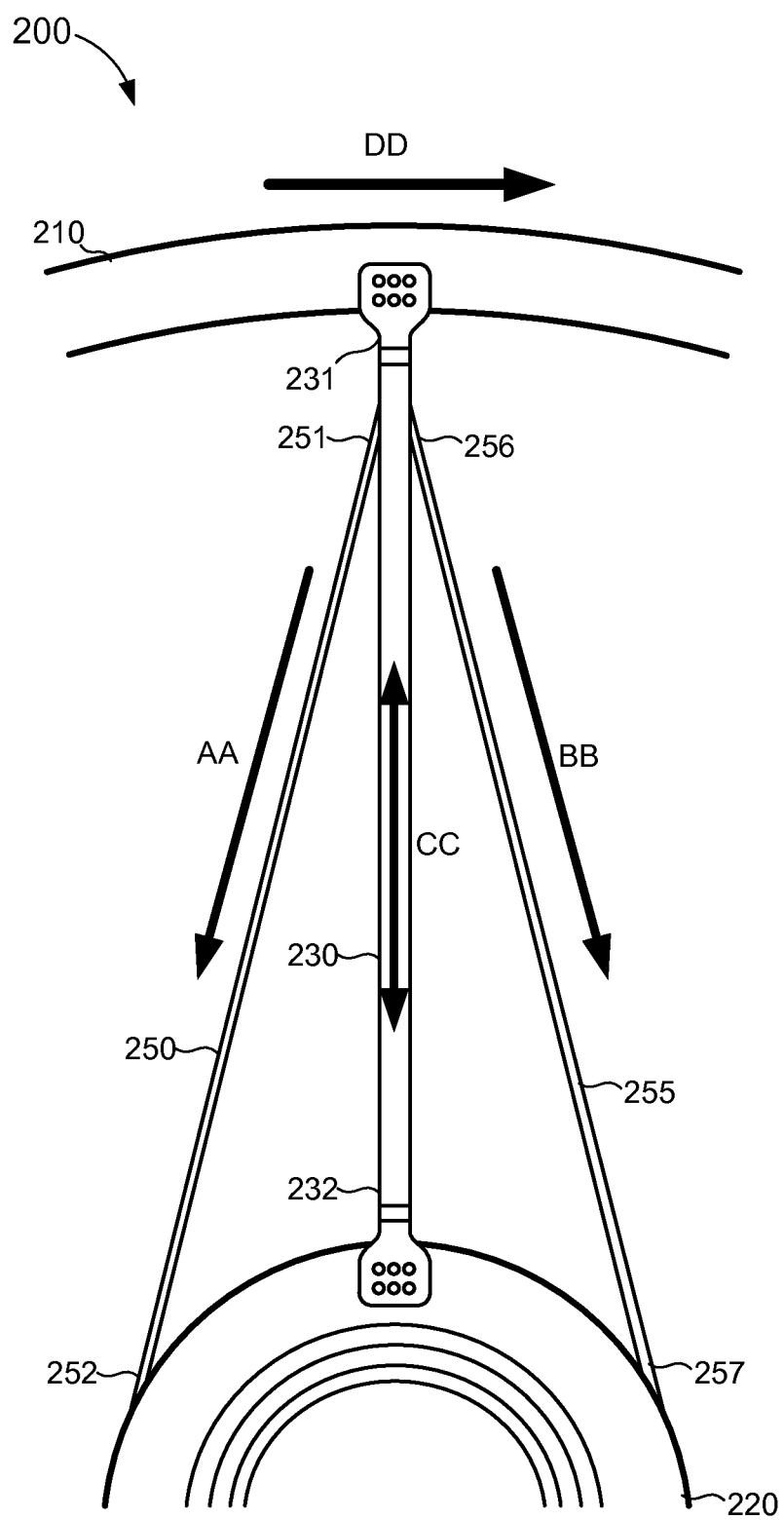
FIG. 3 is a front view illustration of an enlarged portion of the portion of a generator structure of FIG. 2.
Figure 4:
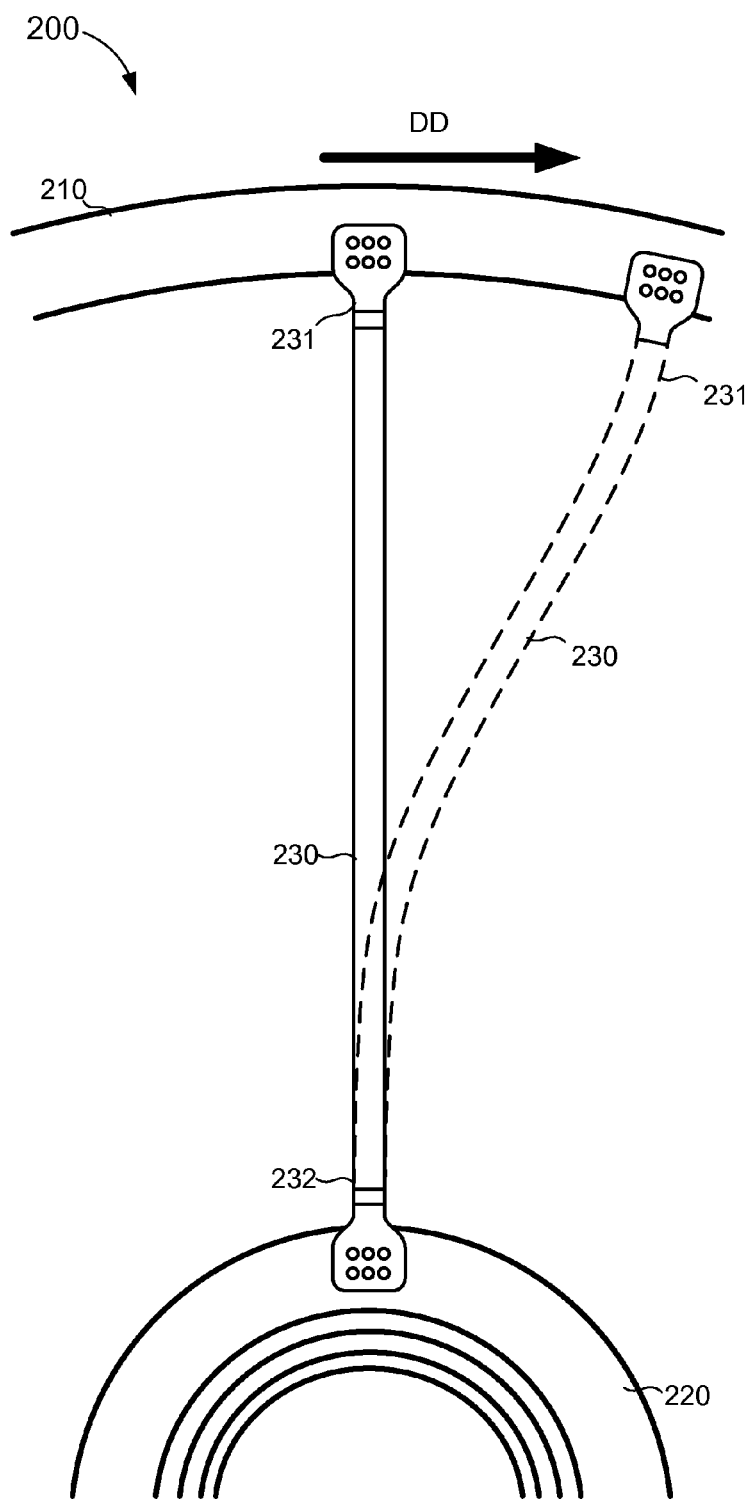
FIG. 4 is a front view illustration of the enlarged portion of the generator structure of FIG. 2 shown without the tension members and under load.

Referring now to FIGS. 2-4, a generator structure 200 includes at least an outer support member 210, an inner support member 220, an elongate compression member 230 (also referred to herein as "compression member" 230), a first elongate tension member 250, and a second elongate tension member 255 (also referred to herein as a "first tension member" and a second tension member, respectively). As shown in FIG. 2, the generator structure 200 further includes a series of compression members 230', first tension members 250', and second tension members 255'. The compression members 230' and the tension members 250' and 255' are substantially similar to the compression member 230 and the tension members 250 and 255, described in further detail herein. Therefore, the compression members 230' and the tension members 250' and 255' are not described in further detail herein. Furthermore, the generator structure 200 can include any number of compression members and tension members. For example, in this embodiment, the generator structure 200 includes six compression members (230 and 230'), six first tension members (250 and 250'), and six second tension members (255 and 255'). In other embodiments, a generator structure can include more or less than six. For example, in some embodiments, a generator structure can include three, four, five, seven, eight, nine, ten, eleven, twelve, or more. In still other embodiments, a generator structure can include less than six compression members and first and second tension members.

The generator structure 200 can be any suitable structure included in an electromagnetic machine. For example, in this embodiment, the generator structure 200 is a stator. As described above in reference to FIG. 1, the outer support member 210 can be a set of PCBs configured to substantially encapsulate a set of windings. Similarly, the inner support member 220 can be any suitable structure such as, for example, a hub.

The compression member 230 includes a first end portion 231 and a second end portion 232 and is configured to extend between the outer support member 210 and the inner support member 220. The compression member 230 can be any suitable shape, size, or configuration. For example, in some embodiments, the compression member 230 can have a substantially rectangular or square cross-section. In other embodiments, the compression member 230 is an I-beam. The first end portion 231 of the compression member 230 is coupled to the outer support member 210 and the second end portion 232 of the compression member 230 is coupled to the inner support member 220. More specifically, the first end portion 231 and the second end portion 232 can be any suitable shape and/or include any suitable structure to couple to the outer support member 210 and the inner support member 220, respectively. For example, in some embodiments, the first end portion 231 and the second end portion 232 can form a flange configured to mate with a portion of the outer support member 210 and a portion of the inner support member 220, respectively. In some embodiments, the first end portion 231 and the second end portion 232 can be bolted to the outer support member 210 and the inner support member 220, respectively. In other embodiments, the end portions 231 and 232 can be riveted, welded, pinned, adhered, or any combination thereof.

The first tension member 250 includes a first end portion 251 coupled to a portion of the compression member 230 and a second end portion 252 coupled to the inner support member 220 or a portion of an adjacent compression member 230'. Similarly, the second tension member 255 includes a first end portion 256 coupled to a portion of the compression member 230 and a second end portion 257 coupled to the inner support member 220 of a portion of an adjacent compression member 230'. As shown in FIG. 2, the first tension member 250 is coupled to a first side of the compression member 230 and the second tension member 255 is coupled to a second side of the compression member 230, substantially opposite the first side.

The first tension member 250 and the second tension member 255 can be any suitable shape, size, or configuration. For example, in some embodiments, the first tension member 250 and the second tension member 255 are cable (e.g., steel braided cable or the like). In some embodiments, the first tension member 250 and the second tension member 255 can be substantially similar. In other embodiments, for example, the first tension member 250 and the second tension member 255 can have different shapes, sizes and/or configurations. For example, the first tension member 250 and the second tension member 255 can be cables and can have a different diameter (e.g., the cables are of a different diameter, thickness, or perimeter).

As shown in FIG. 3, the first tension member 250 and the second tension member 255 can be placed in tension by moving the second end portion 252 of the first tension member 250 in the direction of the arrow AA and the second end portion 257 of the second tension member 255 in the direction of the arrow BB. For example, in some embodiments, the second end portion 252 of the first tension member 250 and the second end portion 257 of the second tension member 255 can be selectively coupled to the inner support member 220 such that the second end portions 252 and 257 can be moved relative to the inner support member 220. In this manner, the first tension member 250 and the second tension member 255 can be placed in tension. Expanding further, the first end portion 251 of the first tension member 250 and the first end portion 256 of the second tension member 255 can be coupled to the compression member 230 such that the first end portions 251 and 256 do not substantially move when the second end portion 252 of the first tension member 250 and the second end portion 257 of the second tension member 255 are moved in the direction of the arrows AA and BB, respectively. Thus, the movement of the second end portions 252 and 257 can produce an elongation of the first tension member 250 and the second tension member 255, respectively, such that the first tension member 250 and the second tension member 255 are placed in tension.

Although not shown, in alternative embodiments, the first tension member 250 and the second tension member 255 can be placed in tension by, for example, moving the first end portion 251 of the first tension member 250 in a direction opposite of the arrow AA and the first end portion 256 of the second tension member 255 in a direction opposite of the arrow BB. In another alternative embodiment, the first tension member 250 can be placed in tension by moving the second end portion 252 of the first tension member 250 in the direction of the arrow AA and the first end portion 251 in the direction opposite of the arrow AA. Similarly, the second tension member 255 can be placed in tension by moving the second end portion 257 of the second tension member 255 in the direction of the arrow BB and the first end portion 256 in the direction opposite of the arrow BB.

In another alternative embodiment, a turnbuckle mechanism (not shown) can be used to place the first tension member 250 and/or the second tension member 255 in tension. For example, a turnbuckle mechanism can be coupled to the first tension member 250 at a location along a length of the first tension member 250 (e.g., at substantially at a middle location along the length), and another turnbuckle mechanism can be coupled to the second tension member 255 at a location along a length of the second tension member 255 (e.g., at substantially at a middle location along the length). In yet another alternative embodiment, the generator structure 200 can include a hydraulic tensioning device (not shown) that can be used to place the first tension member 250 and/or the second tension member 255 in tension.

The tension within the first tension member 250 and the second tension member 255 is such that a compression force is exerted on the compression member 230. Similarly stated, the movement of the second end portion 252 of the first tension member 250 and the movement of the second end portion 257 of the second tension member 255 is such that a compression force is introduced to the portion of the compression member 230 that is coupled to the first tension member 250 and the second tension member 255. In this manner, the compression member 230 exerts a reaction force in the direction of the arrow CC. Furthermore, the compression force within the compression member 230 and the tensile (tension) force within the first tension member 250 and the second tension member 255 are in equilibrium while the generator structure 200 is in an unloaded state (e.g., when a rotor disposed for movement relative to the structure 200 (e.g., stator) is in a fixed location relative to the structure 200).

In use, the compression member 230, the first tension member 250, and the second tension member 255 are collectively configured to resist deflection of the outer support member 210 relative to the inner support member 220. For example, as shown in FIG. 4, without the addition of the tension members 250 and 255, during operation of an electromagnetic machine in which the generator structure 200 can be disposed, the outer support member 210 can tend to be urged to move in a tangential or rotational direction indicated by the arrow DD. In some embodiments, the movement of the outer support member 210 can be in response to forces introduced and/or transferred through the rotation of a rotor relative to a stator (e.g., the generator structure 200). As shown in FIG. 4, the movement of the outer support member 210 in the rotational (tangential) direction DD can be such that when the generator structure 200 does not include tension members 250 and 255 the first end portion 231 is deflected in the direction of rotation to a second position as indicated in dashed lines in FIG. 4, thus deflecting and/or deforming the compression member 230.

The arrangement of the compression member 230, the first tension member 250, and the second tension member 255 within the generator structure 200 can be such that the deflection of the outer support member 210 described above can be substantially limited or eliminated. Similarly stated, the compression member 230, the first tension member 250, and the second tension member 255 can collectively resist the deflection of the outer support member 210, and therefore limit or eliminate deflection or deformation of the compression member 230. Expanding further, the pre-loaded tension within the first tension member 250 can be configured to resist rotational deflection of the outer support member 210 relative to the inner support member 220 by substantially limiting an elongation of the first tension member 250 (e.g., a force greater than the force introduced to deflect the outer support member 210 in the direction of arrow DD would need to be exerted to produce further substantial elongation of the first tension member 250). In addition, the pre-loaded compression within the compression member 230 (e.g., as exerted by the first tension member 250 and the second tension member 255) can be such that the compression member 230 resists further compression (e.g., in the radial direction) exerted on the compression member 230 by the deflection of the outer support member 210 relative to the inner support member 220.

The second tension member 255 can be configured to resist rotational deflection of the outer support member in a direction substantially opposite the direction of the arrow DD. For example, in some embodiments, it can be necessary to stop the operation of an electromagnetic machine (e.g., stop the rotation of a rotor relative to the stator). In such embodiments, forces can be introduced that urge the generator structure 200 and more specifically the outer support member 210 to deflect in a direction substantially opposite the direction of arrow DD. Therefore, the tension within the second tension member 255 is configured to resist the rotational deflection of the outer support member 210 in the direction opposite the direction of arrow DD.

Expanding further, the second tension member 255 can be placed under a given amount of tension such that deflection of the outer support member 210 in the direction of the arrow DD does not substantially place the second tension member 255 in a slack configuration. Said a different way, the second tension member 255 can be maintained in tension when the outer support member 210 deflects in the rotational direction DD. Thus, when the forces are removed that urge rotational deflection of the outer support member 210 (or the direction of the forces are substantially reversed as described above), the second tension member 255 is predisposed in a sufficient magnitude of tension such that the second tension member 255 does not move between a slacked configuration and a tensioned configuration. In this manner, the second tension member 255 substantially resists rotational deflection of the outer support member 210 in the direction opposite the direction DD. In addition, with the tension members 250 and 255 coupled to the compression member 230, the compression member 230 can resist axial and/or radial deflection of the outer support member 220 relative to the inner support member 210.

Furthermore, during normal operating conditions, it may be desirable to have substantially no slack on the side of the compression member 230 to which torsional forces are applied such that one tension member (250 or 255) is more heavily stressed than the other tension member (250 or 255). However, during non-standard operation conditions, such as short circuit events or braking, it may be desirable to permit some slack on the tension member (250, 255) on the compression side of the compression member 230.

Figure 5:
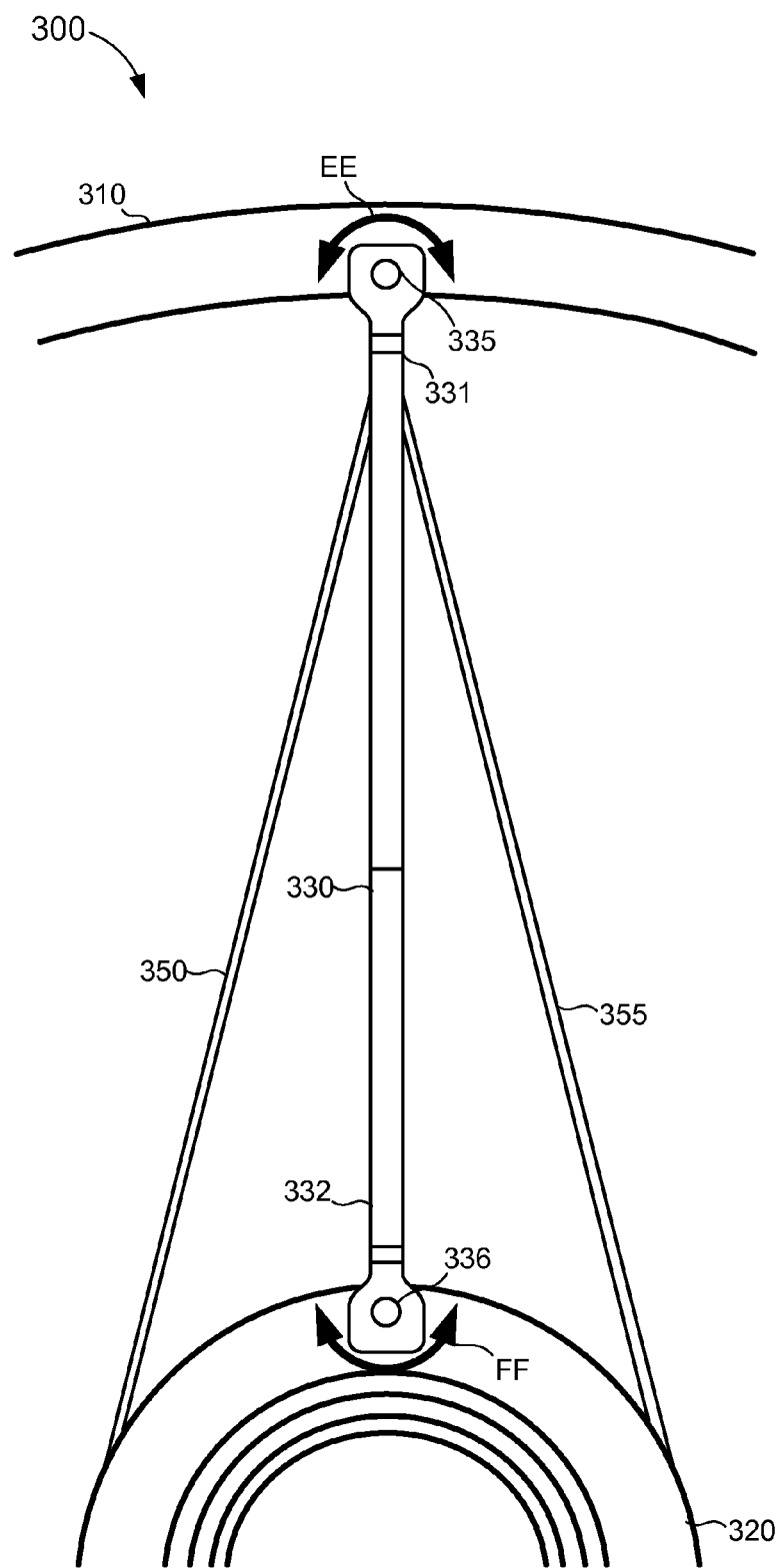
FIG. 5 is a front view illustration of a portion of a generator structure according to an embodiment.

While the compression member 230 is shown in FIGS. 2-4 as being rigidly coupled to the outer support member 210 and the inner support member 220, in some embodiments, a generator structure can include a compression member that is coupled to an outer support member and an inner support member for pivotal motion. For example, FIG. 5 illustrates a portion of a generator structure 300, according to an embodiment. The generator structure 300 includes an outer support member 310, an inner support member 320, an elongate compression member 330 (also referred to herein as a "compression member"), a first elongate tension member 350, and a second elongate tension member 355 (also referred to herein as a "first tension member" and a "second tension member," respectively). The generator structure 300 can be substantially similar in form and function as the generator structure 200 described above with reference to FIGS. 2-4. However, the generator structure 300 differs from the generator structure 200 in the manner in which the compression member 330 is coupled to the outer support member 310 and the inner support member 320.

Expanding further, the compression member 330 includes a first end portion 331 and a second end portion 332. The first end portion 331 includes a pivot mechanism 335 configured to pivotally couple the first end portion 331 of the compression member 330 to the outer support member 310. The pivot mechanism 335 can be, for example, a pin (with or without a set of bearings), a bushing, a spherical joint, such as a ball joint, and/or any other suitable mechanism. In this manner, the first end portion 331 of the compression member 330 can pivot relative to the outer support member 310 as indicated by the arrow EE. Moreover, the pivoting motion can be limited to a specific range such that the deflection of the outer support member 310 is minimized.

The second end portion 332 can similarly include a pivot mechanism 336 configured to pivotally couple the second end portion 332 of the compression member 330 to the inner support member 320. The pivot mechanism 336 can be similar in form and function to the pivot mechanism 335 of the first end portion 331. In this manner, the second end portion 332 can pivot relative to the inner support member 320 as indicated by the arrow FF. The pivotal coupling of the compression member 330 to the outer support member 310 and the inner support member 320 can be such that undesirable deflection of the outer support member 310 and/or the compression member 330 is substantially reduced or eliminated. For example, in some embodiments that do not include a pivotal coupling of the compression member 330, reaction forces within the outer support member 310 and/or the compression member 330 can be such that the outer support member 310 is urged to deflect in the axial and/or radial direction. Thus, by allowing a given amount of rotational deflection of the outer support member 310 relative to the compression member 330 (e.g., via the pivot mechanism 335), undesirable deflection of the outer support member 310 in the axial and/or radial direction can be substantially reduced or eliminated.

Although the pivotal movement of the compression member 330 is shown in a direction EE and a direction FF in alternative embodiments, a pivotal coupling can be used that provides movement in other directions. For example, a pivotal coupling can be used that provides multiple degrees of freedom or directions of rotation of the compression member to reduce or eliminate buckling of the compression member in multiple directions. In some embodiments the pivotal coupling can include, for example, a spherical joint, such as a ball joint.

Figure 6:
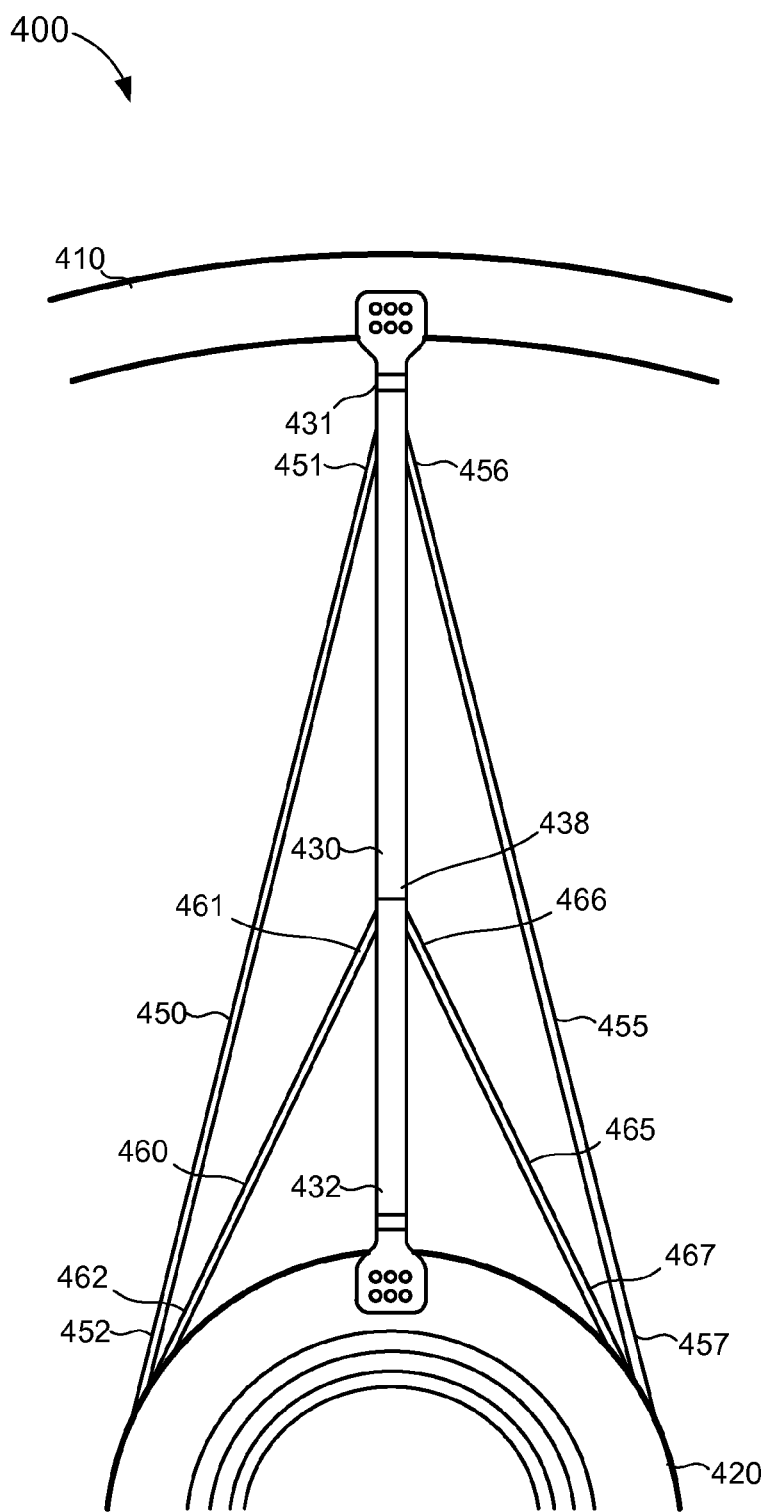
FIG. 6 is a front view illustration of a portion of a generator structure according to an embodiment.

While the generator structures 200 and 300 described above include a first tension member 250 and a second tension member 255, in some embodiments, a generator structure can include any suitable number of tension members. For example, FIG. 6 illustrates a portion of a generator structure 400 according to another embodiment. The generator structure 400 includes an outer support member 410, an inner support member 420, an elongate compression member 430, a first elongate tension member 450, a second elongate tension member 455, a third elongate tension member 460, and a fourth elongate tension member 465. The generator structure 400 can be substantially similar in function to the generator structure 200 described above with reference to FIGS. 2-4; therefore, portions of the generator structure 400 are not described in further detail herein.

As described above, a first end portion 451 of the first elongate tension member 450 (also referred to herein as "first tension member" 450) and a first end portion 456 of the second elongate tension member 455 (also referred to herein as "second tension member"455) are configured to be coupled to a portion of the compression member 430. More specifically, the first end portion 451 of the first tension member 450 and the first end portion 456 of the second tension member 455 are coupled to a first end portion 431 of the compression member 430. In a similar manner, a first end portion 461 of the third elongate tension member 460 (also referred to herein as a "third tension member") and a first end portion 466 of the fourth elongate tension member 465 (also referred to herein as a "fourth tension member") can be coupled to a second portion of the elongate compression member 430 (also referred to herein as a "compression member"). The third tension member 460 and the fourth tension member 465 can be configured to be coupled to the compression member 430 at any suitable location along a length of the compression member 430. For example, in some embodiments, the third tension member 460 and the fourth tension member 465 can be coupled to a center portion 438 of the compression member 430. In other embodiments, the tension members 460 and 465 can be coupled to the compression member 430 between the first end portion 431 and the center portion 438. In still other embodiments, the tension members 460 and 465 can be coupled to the compression member 430 between the second end portion 435 and the center portion 438.

The first tension member 450, the second tension member 455, the third tension member 460, and the fourth tension member 465 each include a second end portion (e.g., a second end portion 452, a second end portion 457, a second end portion 462, and a second end portion 467, respectively). The second end portions 452, 457, 462, and 467 are configured to be coupled to the inner support member 420 as shown in FIG. 6. In some embodiments, the second end portions 452, 457, 462, and 467 can be coupled to the inner support member 420 in a similar manner as described above with respect to FIGS.

2-4. In this manner, the first tension member 450, the second tension member 455, the third tension member 460, and the fourth tension member 465 can be placed in tension and be configured to resist axial and/or rotational deflection of the outer support member 410 relative to the inner support member 420.

The arrangement of the third tension member 460 and the fourth tension member 465 can further be configured to selectively exert a compression force on the compression member 430. Expanding further, the third tension member 460 and the fourth tension member 465 can be any suitable length and be coupled at any suitable position along a length of the compression member 430. Thus, when the third tension member 460 and the fourth tension member 465 are placed in tension, the third tension member 460 and the fourth tension member 465 can exert a compression force (e.g., in the radial direction) on a desired portion of the compression member 430. In this manner, the compression within the compression member 430 can be selectively defined to modify the characteristics and/or behavior of the compression member 430 (e.g., points of deflection, areas of stress concentration, or the like). In this manner, the compression member 430, the first tension member 450, the second tension member 455, the third tension member 460, and the fourth tension member 465 collectively resist axial, radial, and rotational deflection of the outer support member 410 relative to the inner support member 420, as described above in reference to the generator structure 200 shown in FIGS. 2-4. For example, the compression member 430 can resist axial and/or radial deflection of the outer support member relative to the inner support member 410, and the tension members (450, 455, 460, and 465) can each resist axial and/or rotational deflection of the outer support member 410 relative to the inner support member 420.

Figure 7:
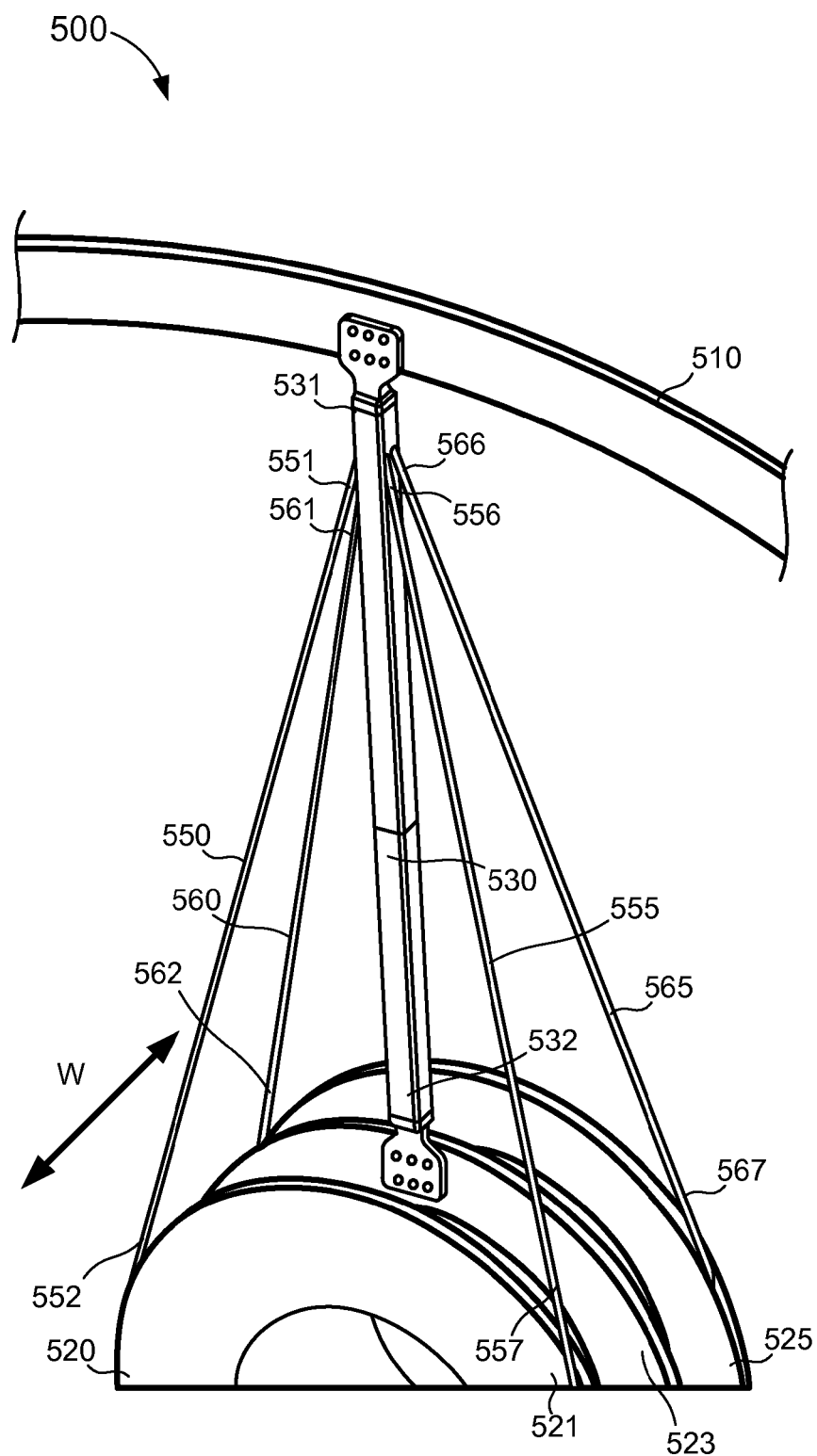
FIG. 7 is a perspective view illustration of a portion of a generator structure according to an embodiment.

While the generator structures described above have included components that are disposed at a substantially similar position along a given axis (e.g., along the axis of rotation of the rotor), in other embodiments, the components can be disposed at different locations along an axis of rotation or along an axial width of the inner support member of the generator structure. For example, FIG. 7 illustrates a portion of a generator structure 500 according to an embodiment. The generator structure 500 includes an outer support member 510, an inner support member 520, an elongate compression member 530, a first elongate tension member 550, a second elongate tension member 555, a third elongate tension member 560, and a fourth elongate tension member 565. The generator structure 500 can be substantially similar in function to the generator structures described above; therefore, portions of the generator structure 500 are not described in further detail herein.

As described above in reference to the generator structure 200 shown in FIGS. 2-4, the elongate compression member 530 (also referred to herein as a "compression member") includes a first end portion 531 that is coupled to the outer support member 510 and a second end portion 532 that is coupled to the inner support member 520. Similarly, the first elongate tension member 550, the second elongate tension member 555, the third elongate tension member 560, and the fourth elongate tension member 565 (also referred to herein as a "first tension member," a "second tension member," a "third tension member," and a "fourth tension member," respectively) each include a first end portion (e.g., a first end portion 551, a first end portion 556, a first end portion 561, and a first end portion 566, respectively). The first end portions 551, 556, 561, and 566 are coupled to the first end portion 531 of the compression member 530. Furthermore, first tension member 550, the second tension member 555, the third tension member 560, and the fourth tension member 565 each include a second end portion (e.g., a second end portion 552, a second end portion 557, a second end portion 562, and a second end portion 567, respectively). The second end portions 552, 557, 562, and 567 are each coupled to the inner support member 520.

More specifically as shown in FIG. 7, the inner support member 520 includes a first inner support portion 521 disposed at a first position along an axial width W of the inner support member 520, a second inner support portion 523 disposed at a second position along the axial width W, and a third inner support portion 525 disposed at a third position along the axial width W. The first tension member 550 and the second tension member 555 are coupled to the first inner support portion 521, the compression member 530 coupled to the second inner support portion 523, and the third tension member 560 and the fourth tension member 565 are coupled to the third inner support portion 525. Therefore, the second end portions 552 and 557 of the first and second tension member 550 and 555, respectively, are disposed at the first position along the axial width W of the inner support member 520; the second end portion 532 of the compression member 530 is disposed at the second position along the axial width W; and the second end portions 562 and 567 of the third and fourth tension members 560 and 565, respectively, are disposed at the third position along the axial width W. Although not shown, in an alternative embodiment, the compression member 530 can be pivotally coupled to the outer support member 510 and pivotally coupled to the inner support member 520. In some such embodiments, the pivotal coupling of the compression member 530 can provide multiple directions of rotation of the compression member 530 to reduce or eliminate buckling of the compression member 530 in multiple directions.

The arrangement of the inner support member 520, the compression member 530, the first tension member 550, the second tension member 555, the third tension member 560, and the fourth tension member 565 is configured to resist axial, radial, and rotation deflection of the outer support member 510 relative to the inner support member 520. Similarly stated, by disposing portions (e.g., the second end portions) of the tension members 550, 555, 560, and 565 and the compression member 530 at spaced locations in both the axial and rotational (e.g., at different locations along the circumference of the inner support member 520) directions, the tension members 550, 555, 560, 565 and the compression member 530 can further reduce the axial, radial, and rotational deflection of the outer support member 510 relative to the inner support member 520. Specifically, in this embodiment, the compression member 530 can resist rotational and radial deflection of the outer support member 510 relative to the inner support member 520, and the tension members 550, 555, 560 and 565 can each resist axial and/or rotational deflection of the outer support member 510 relative to the inner support member 520.

Figure 8:
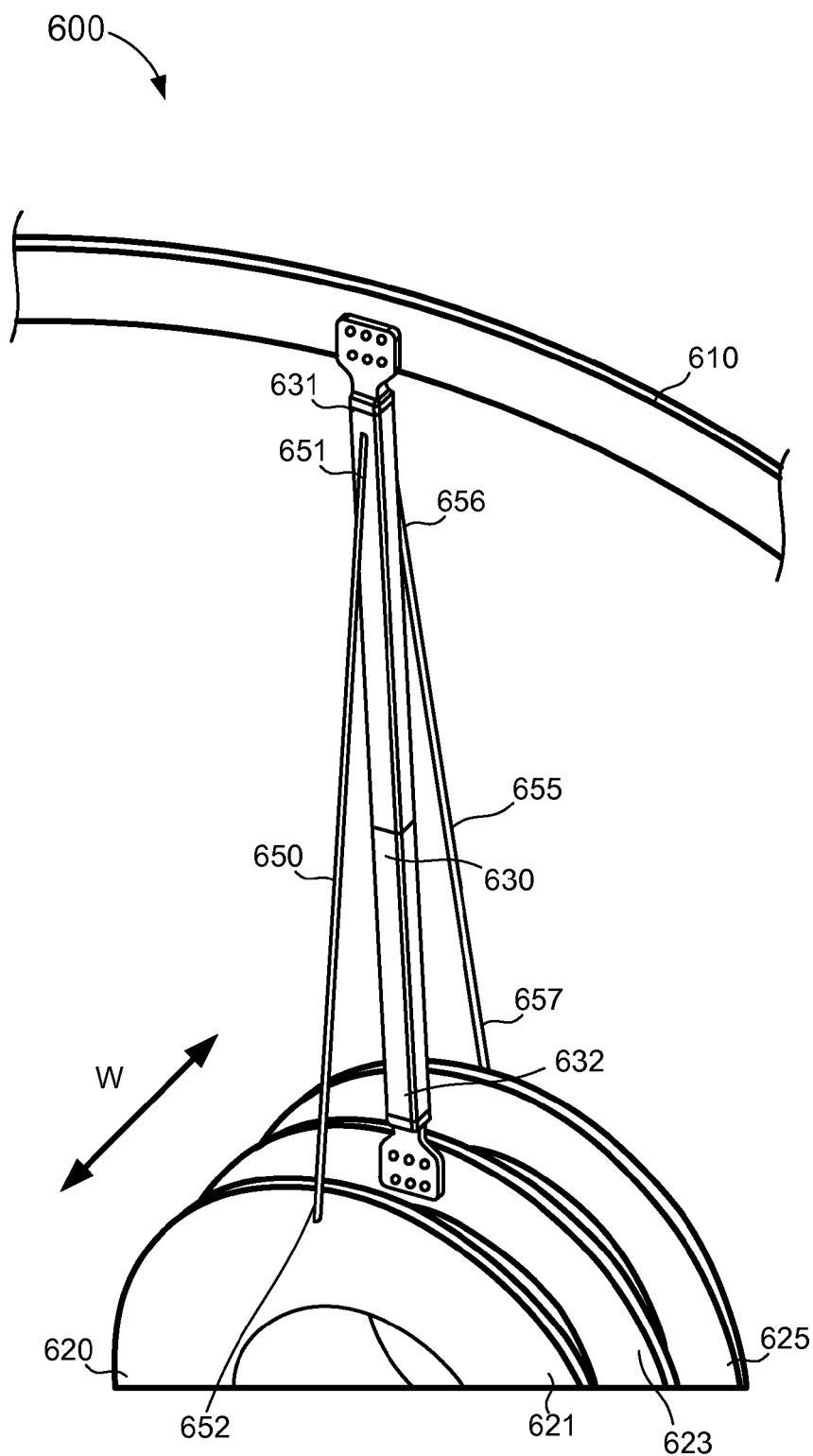
FIG. 8 is a perspective view illustration of a portion of a generator structure according to an embodiment.

While the generator structure 500 shown in FIG. 7 includes four tension members disposed at a spaced distances from each other along the circumference of the inner support member 520, in some embodiments, a generator structure includes two tension members that are substantially coplanar relative to an axis defined by an inner support member. For example, FIG. 8 illustrates a portion of a generator structure 600 according to an embodiment. The generator structure 600 includes an outer support member 610, an inner support member 620, an elongate compression member 630 (also referred to herein as "compression member" 630), a first elongate tension member 650 and a second elongate tension member 655 (referred to herein as "first tension member" 650 and "second tension member" 655, respectively). The generator structure 600 can be substantially similar in function to the generator structures described above; therefore, portions of the generator structure 600 are not described in further detail herein.

As described above in reference to previous embodiments, the compression member 630 includes a first end portion 631 that is coupled to the outer support member 610 and a second end portion 632 that is coupled to the inner support member 620. Similarly, the first tension member 650 and the second tension member 655 include a first end portion 651 and 656, respectively, each configured to be coupled to the first end portion 631 of the compression member 630. Furthermore, the first tension member 650 and the second tension member 655 include a second end portion 652 and 657, respectively, each configured to be coupled to the inner support member 620.

As shown and described in reference to the inner support member 520 of FIG. 7, the inner support member 620 has an axial width W and includes a first inner support portion 621, a second inner support portion 623, and a third inner support portion 625. As shown in FIG. 8, the second end portion 652 of the first tension member 650 is coupled to the first inner support portion 621, the second end portion 632 of the compression member 630 is coupled to the second inner support portion 623, and the second end portion 657 of the second tension member 655 is coupled to the third inner support portion 625. In this manner, the compression member 630, the first tension member 650, and the second tension member 655 are collectively configured to resist axial, radial, and rotational deflection of the outer support member 610 relative to the inner support member 620. More specifically, the first tension member 650 and the second tension member 655 can resist deflection of the outer support member 610 in the axial direction (e.g., a direction substantially parallel to the axial width W and the compression member 630 can resist rotational and/or radial deflection of the outer support member 610 relative to the inner support member 620 (e.g., the geometry, the pre-loaded compression force exerted by the tension members 650 and 655, or the like can be configured to resist the deflection).

Figure 9:
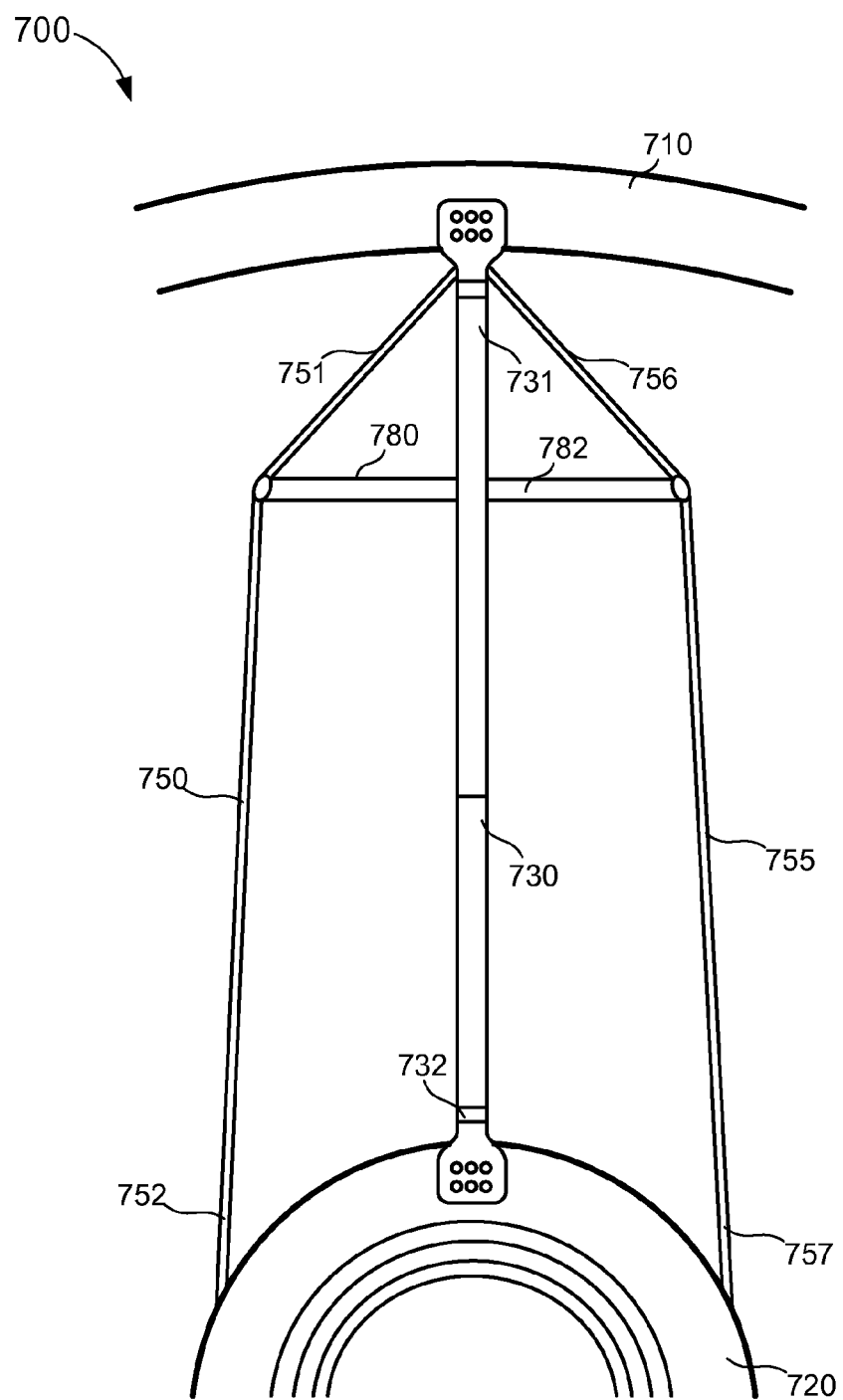
FIG. 9 is a front view illustration of a portion of a generator structure according to an embodiment.

Referring now to FIG. 9, in some embodiments, a generator structure 700 includes an outer support member 710, an inner support member 720, an elongate compression member 730 (also referred to herein as a "compression member"), a first elongate tension member 750 and a second elongate tension member 755 (also referred to herein as "first tension member" and a "second tension member," respectively), a first transverse compression member 780 and a second transverse compression member 782. The generator structure 700 can be substantially similar in function to the generator structures described above; therefore, portions of the generator structure 700 are not described in further detail herein.

As described in detail above with respect to previous embodiments, the compression member 730 includes a first end portion 731 coupled to the outer support member 710 and a second end portion 732 coupled to the inner support member 720. Similarly, the first tension member 750 and the second tension member 755 each include a first end portion 751 and 756, respectively, coupled to the compression member 730, and a second end portion 752 and 757, respectively, coupled to the inner support member 720.

The first transverse compression member 780 (also referred to herein as a "first transverse member") and the second transverse compression member 782 (also referred to herein as a "second transverse member") can each be coupled to the compression member 730 at any suitable location along a length of the compression member 730. For example, as shown in FIG. 9, the first transverse member 780 and the second transverse member 782 can each be coupled to the compression member 730 at or near the first end portion 731. The first transverse member 780 and the second transverse 782 can each be coupled to the compression member 730 in any suitable manner, such as, for example, with bolts or welding. In some embodiments, the first transverse member 780 and the second transverse member 782 can each be monolithically formed with the compression member 730. In some embodiments, the transverse members 780 and 782 can be pivotally coupled to the compression member 730. For example, a pivot mechanism, similar to the pivot mechanism 335 described above for generator structure 300 can be used. The pivot mechanism can be, for example, a pin (with or without a set of bearings), a bushing, a spherical joint and/or any other suitable mechanism that allows the transverse members 780 and 782 to pivot or rotate relative to the compression member 730.

In some embodiments, the first transverse member 780 and the second transverse member 782 are each coupled to the compression member 730 such that the first transverse member 780 and the second transverse member 782 each extend substantially outward from a longitudinal axis defined by the compression member 730. In some embodiments, the first transverse member 780 and the second transverse member 782 are each coupled to the compression member 730 such that the first transverse member 780 and the second transverse member 782 each extend substantially perpendicular to the longitudinal axis defined by the compression member 730. In yet other embodiments, the transverse members 780 and 782 can be coupled to the compression member 730 such that the transverse member 780 can extend at any suitable angle (e.g., an angle less than or greater than 90 degrees) from the compression member 730.

As shown in FIG. 9, the transverse members 780 and 782 are also coupled to a portion of the first tension member 750 and the second tension member 755, respectively, as described above with respect to FIG. 1. For example, the transverse members 780 and 782 can be coupled to the first tension member 750 and the second tension member 755, respectively, for example, with a bolt, by welding, a pivot mechanism, or other suitable coupling member as described above. In some embodiments, the transverse members 780 and 782 are coupled to a portion of the first tension member 750 and a portion of the second tension member 755, respectively, such that the tension within the first tension member 750 and the tension within the second tension member 755 is distributed in a given manner. For example, in some embodiments, the transverse members 780 and 782 can engage the first end portion 751 of the first tension member 750 and the first end portion 756 of the second tension portion 755, respectively, such that the tension within the first end portions 751 and 756 is increased. In this manner, the transverse members 780 and 782 can be configured to substantially enhance, tune, or otherwise modify the distribution and therefore, the effects of the tension within the first tension member 750 and the second tension member 755.

In some embodiments, the transverse members 780 and 782 can substantially engage the first end portion 751 of the first tension member 750 and the first end portion 756 of the second tension member 755, respectively, such that the first tension member 750 and the second tension member 755 have a greater resistance to a rotational deflection of the outer support member 710 relative to the inner support member 720. Expanding further, the transverse members 780 and 782 can engage the first end portion 751 of the first tension member 750 and the first end portion 756 of the second tension member 755, respectively, such that an angle between the first end portions 751 and 756 and the first end portion 731 of the compression member 730 is increased (e.g., the transverse members 780 and 782 separate a portion of the first tension member 750 and a portion of the second tension member 755, respectively, from the first end portion 731 of the compression member 730). In this manner, the tension within the first end portion 751 of the first tension member 750 and the tension within the first end portion 756 of the second tension member 750 exerts a force that is more aligned with the direction of rotational deflection of the outer support member 710. Thus, the first end portions 751 and 756 of the first tension member 750 and the second tension member 755, respectively, can be in less tension while still resisting rotational deflection of the outer support member 710 relative to the inner support member 720.

Furthermore, the transverse members 780 and 782 can engage the first tension member 750 and the second tension member 755, respectively, such that a portion of the tensile force (e.g., the tension) within the second end portions 752 and 757, respectively, exerts a compression force on the compression member 730 (e.g., in the radial direction). Similarly stated, the transverse member 780 can be configured to transfer a portion of the tension force to the compression member 730 such that the compression member 730 is placed in compression. In some embodiments, the arrangement of the first transverse member 780 and the second transverse member 782 can substantially reduce buckling sensitivity (or improve resistance to buckling) of compression member 730 under the force exerted by the first tension member 750 and/or the second tension member 755 and/or bucking of the outer support member 710. In some embodiments, the first transverse member 780 engages the first tension member 750 and second transverse member 782 engages the second tension member 755 such that the tension within the second end portions 752 and 757, respectively, exert a force on the compression member 730 that is more aligned with a longitudinal axis of the compression member 730 (e.g., more aligned with the radial direction). Thus, the stresses within the compression member 730 can be substantially reduced and the compression member 730 can further resist axial, radial, and/or rotational deflection of the outer support member 710.

Figure 10:
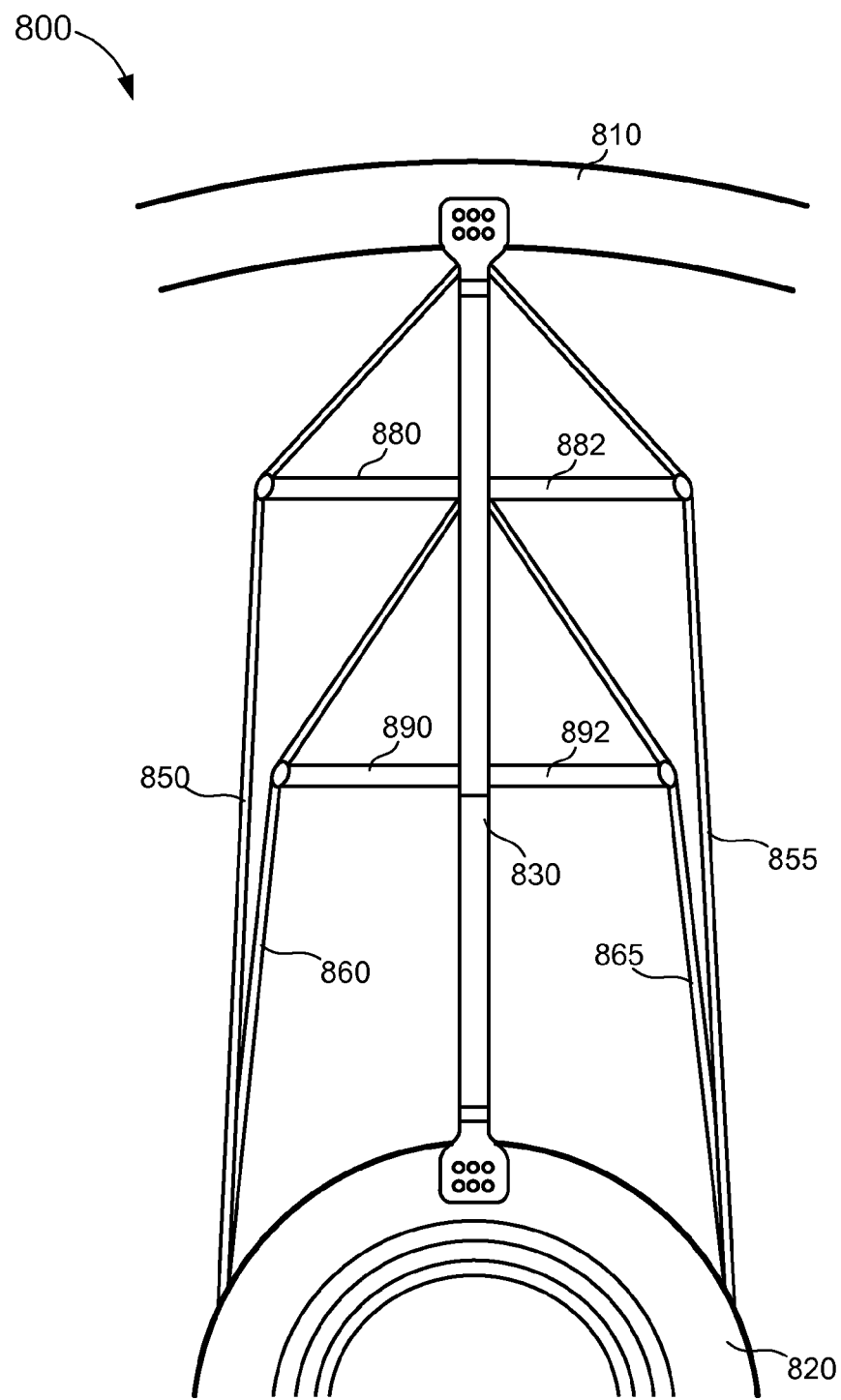
FIG. 10 is a front view illustration of a portion of a generator structure according to an embodiment.

Referring now to FIG. 10, in some embodiments, a generator structure 800 can include an outer support member 810, an inner support member 820, an elongate compression member 830 (also referred to herein as "compression member"), a first elongate tension member 850, a second elongate tension member 855, a third elongate tension member 860, a fourth elongate tension member 865 (also referred to herein as "first tension member," "second tension member," "third tension member" and fourth tension member," respectively), a first transverse compression member 880, a second transverse compression member 882, a third transverse compression member 890 and a fourth transverse compression member 892 (also referred to herein as "first transverse member," "second transverse member," "third transverse member," and "fourth transverse member," respectively). The generator structure 800 can be substantially similar in function to the generator structures described herein; therefore, portions of the generator structure 800 are not described in further detail herein.

As shown in FIG. 10, the third transverse member 890 and the fourth transverse member 892 are substantially similar in function to the first transverse member 880 and the second transverse member 882. In this manner, the third transverse member 890 can be coupled to the third tension member 860 and the fourth transverse member 892 can be coupled to the fourth tension member 865 to further enhance, tune, or otherwise modify the distribution and therefore, the effects of the tension within the third tension member 860 and the fourth tension member 865. Thus, the compression member 830, the tension members 850, 855, 860, and 865, and the transverse members 880, 882, 890, and 892 can be collectively configured to resist radial, axial, and rotational deflection of the outer support member 810 relative to the inner support member 820, as described above.

While the generator structure 800 is shown in FIG. 10 as including tension members 850, 855, 860 and 865 coupled to the inner support member 820 at substantially the same location along an axial width of the inner support member, in other embodiments, the tension members can be distributed along the axial width of the inner support member in a similar manner as described in reference to FIG. 7. In such an embodiment, the transverse compression members 880, 882, 890 and/or 892 can extend perpendicular to the elongate compression member but in a direction parallel to an axis defined along the axial width of the inner support member 820. In another alternative embodiment, the first and second transverse members 880, 882 and/or the third and fourth transverse member 890, 892 can each be disposed at an angle less than or greater than 90 degrees relative to the elongate compression member 830. Furthermore, in some embodiments, the first and second transverse members 880, 882 can be disposed at a different angle relative to the elongate compression member 830 than the third and fourth transverse member 890, 892.

Moreover, while the generator structure 800 is shown and described as including four transverse members and four tension members, in alternative embodiments, a generator structure can include any number of transverse members and tension members. For example, in some embodiments, a generator structure can include a first and second transverse member and a first and second tension member coupled to a first side of a compression member, and a third transverse member and a third tension member coupled to a second side of the compression member.

In some embodiments, an electromagnetic machine can be provided in separate sections or portions that can be assembled together at a desired installation site for use. In this manner, for very large electromagnetic machines, such as, for example, an electric generator for a wind turbine, the separate sections or portions of the electromagnetic machine can be easier and more practical to transport. In some embodiments, a kit or kits can be provided containing various combinations and/or sub-combinations of the structures for an electromagnetic machine described herein. For example, in some embodiments, a kit can include one or more outer support member segments configured to support a conductive winding or a magnet, an inner support member or one or more inner support member segments, one or more elongate compression members, one or more elongate tension members, and/or one or more transverse compression members, as described herein. The outer support member segment can be, for example, a portion or segment of an outer support member. For example, in an embodiment in which the outer support member is a circular ring, the outer support member segment can be a portion of the circular ring, such as for example, a fourth, a third, a half, etc. of the circular ring. Similarly, the inner support member (e.g., hub) can be provided in segments (e.g., a fourth, a third, a half, etc.) that can be assembled together at an installation site for use.

In this manner, a kit can be delivered to an installation site (e.g., a wind farm) and assembled to form a portion or section of the electromagnetic machine. In some embodiments, the kit can be assembled to form a portion of a generator structure. In such embodiments, the kit can be coupled to any number of similar kits and/or to any other suitable structure of the electromagnetic machine.

Figure 11:
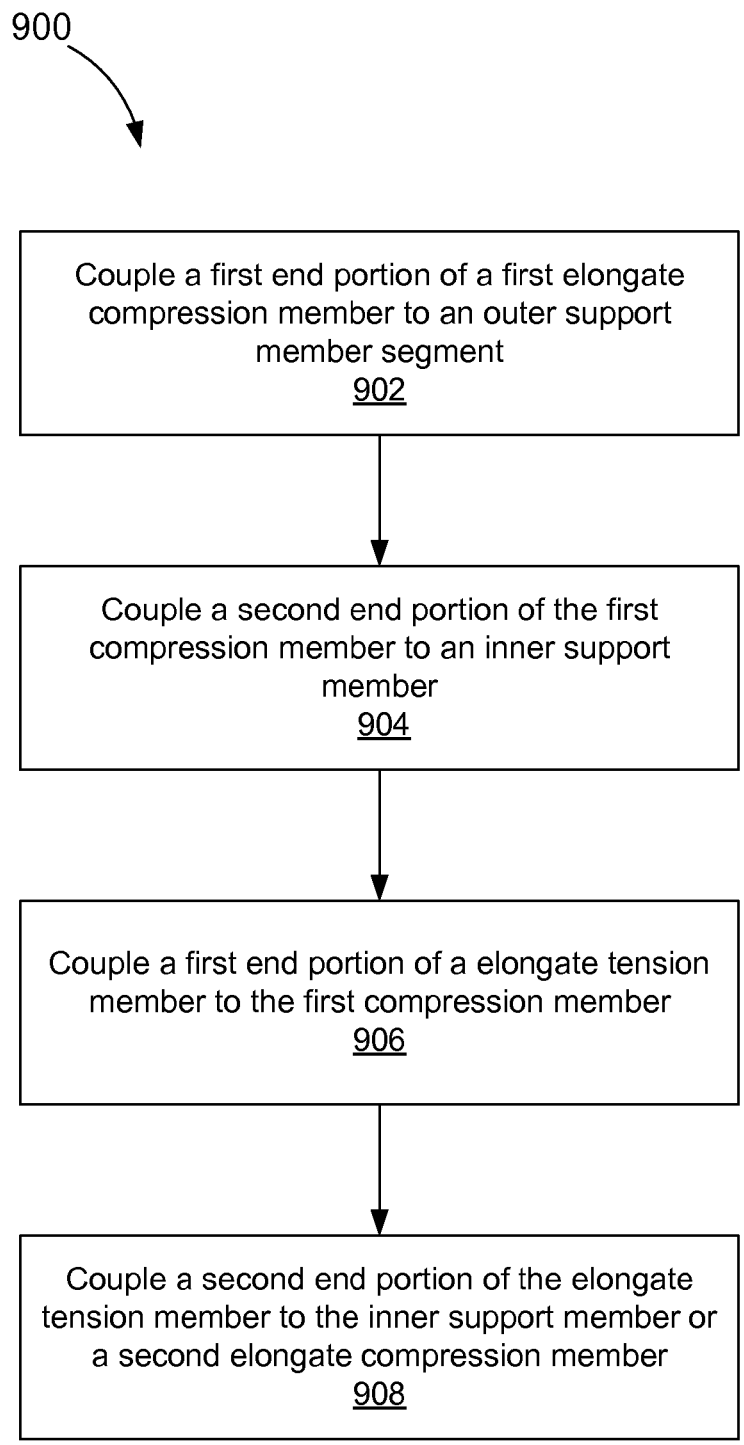
FIG. 11 is a flowchart illustrating a method of increasing the structural efficiency of a structure included in an electromagnetic machine.

FIG. 11 is a flowchart illustrating a method 900 of increasing the structural efficiency and/or the resistance to deflection of a structure included in an electromagnetic machine. The method 900 can be used to assemble, for example, the generator structures described herein. For example, in some embodiments, the method 900 can be performed on and/or used to form a stator included in an electromagnetic machine. In other embodiments, the method 900 can be performed on and/or used to form a rotor.

The method 900 includes coupling a first end portion of a first elongate compression member to an outer support member segment at 902. The outer support member segment can be, for example, a portion of a printed circuit board configured to encapsulate a series of windings. In other embodiments, the outer support member segment can be configured to include or support a magnet. The method 900 further includes coupling a second end portion of the first elongate compression member to an inner support member at 904. The first end portion and the second end portion of the first elongate compression member can each be coupled using any suitable method such as, for example, via a bolt(s), a pin, a weld(s), a rivet(s), an adhesive, and/or the like.

The method 900 further includes coupling a first end portion of an elongate tension member to the first elongate compression member at 906. The elongate tension member can be configured to be coupled to the first elongate compression member at any suitable location along a length of the first elongate compression member. For example, in some embodiments, the elongate tension member can be coupled to the first end portion of the first elongate compression member. In some embodiments, the elongate tension member can be coupled to a side of the first elongate compression member that is substantially opposite a direction of rotation of a rotor assembly.

At 908, a second end portion of the elongate tension member can be coupled to the inner support member or to a second elongate compression member. In some embodiments, the second end portion of the elongate tension member can be selectively coupled to the inner support member such that a tension within the elongate tension member can be selectively defined. In other embodiments, the second end portion of the elongate tension member can be selectively coupled to, for example, a second end portion of an adjacent elongate compression member (e.g., the second elongate compression member). In such embodiments, the elongate tension member can be selectively coupled the second elongate compression member such that the tension within the elongate tension member can be selectively defined. In this manner, at least the first elongate compression member and the elongate tension member can be collectively configured to resist an axial, radial, and/or rotational deflection of the outer support member segment relative to the inner support member.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a structure for an electromagnetic machine can include a different quantity and/or combination of tension members, compression members and/or transverse compression members than shown with reference to specific embodiments. In another example, any of the embodiments described herein can include a compression member that is coupled to an outer support member and to an inner support member with a pivot mechanism similar to the pivot mechanisms 332 and 337 shown and described with reference to FIG. 5.

In addition, it should be understood that the features, components and methods described herein for each of the various embodiments can be implemented in a variety of different types of electromagnetic machines, such as, for example, axial and radial machines that can support rotational movement of a rotor assembly relative to a stator assembly.

What is claimed is:

1. An apparatus, comprising:
a structure for an electromagnetic machine including:
an outer support member configured to support one of a conductive winding or a magnet;
an inner support member;
a first elongate compression member;
a second elongate compression member; and
an elongate tension member,
each of the first elongate compression member and second elongate compression member having a first end coupled to the outer support member and a second end coupled to the inner support member,
the elongate tension member having a first end portion coupled to a portion of the first compression member and a second end portion coupled to at least one of the inner support member and the second elongate compression member,
the elongate tension member being under tension and applying a compressive force to the first elongate compression member when the structure for an electromagnetic machine is in an unloaded state.

2. The apparatus of claim 1, wherein the elongate tension member is a first elongate tension member, the structure for an electromagnetic machine including a second elongate tension member, the first end portion of the first elongate tension member coupled to the first elongate compression member at a first location,
the second elongate tension member having a first end portion coupled to the first elongate compression member at a second location on the first elongate compression member different than the first location and a second end portion coupled to at least one of the inner support member and the second compression member,
each of the first elongate tension member and the second elongate tension member being configured to resist rotational deflection of the outer support member relative to the inner support member.

3. The apparatus of claim 1, wherein the elongate tension member is a first elongate tension member, the structure for an electromagnetic machine including a second elongate tension member and a third elongate compression member, the first elongate tension member configured to resist rotational deflection of the outer support member relative to the inner support member in a first rotational direction,
the second elongate tension member having a first end portion coupled to the first elongate compression member and a second end portion coupled to at least one of the inner support member and the third elongate compression member, the second elongate tension member configured to resist rotational deflection of the outer support member relative to the inner support member in a second rotational direction, opposite to the first rotational direction.

4. The apparatus of claim 1, wherein the elongate tension member is a first elongate tension member, the structure for an electromagnetic machine further including a second elongate tension member, a first transverse compression member and a second transverse compression member, the second end portion of the first elongate tension member coupled to one of the inner support member and the second compression member at a first location, the second elongate tension member having a first end portion coupled to the first elongate compression member and a second end portion coupled to one of the inner support member and the second elongate compression member at a second location different than the first location, the first transverse compression member coupled to the first elongate tension member and coupled to the first elongate compression member such that a length of the second transverse compression member extends at an angle relative to a length of the first elongate compression member, the second transverse compression member coupled to the second elongate tension member and coupled to the first elongate compression member such that a length of the second transverse compression member extends at an angle relative to a length of the first elongate compression member, the first transverse compression member and the second transverse compression member collectively providing increased resistance to buckling of the first compression member.

5. The apparatus of claim 1, wherein the structure for an electromagnetic machine further includes a transverse compression member coupled to the elongate tension member and coupled to the first elongate compression member such that a length of the transverse compression member extends at an angle relative to a length of the first elongate compression member, the transverse compression member providing increased resistance to buckling of the first elongate compression member.

6. The apparatus of claim 1, wherein the elongate tension member is a first elongate tension member, the structure for an electromagnetic machine including a second elongate tension member, the inner support member having an axial width, the second end portion of the first elongate tension member being coupled to the inner support member at a first location along the axial width of the inner support member, the second elongate tension member having a first end portion coupled to the first elongate compression member and a second end portion coupled to the inner support member at a second location along the axial width of the inner support member different than the first location along the axial width of the inner support member, each of the first elongate tension member and the second elongate tension member configured to resist axial deflection of the outer support member relative to the inner support member.

7. The apparatus of claim 1, wherein the first end of the first elongate compression member is coupled to the outer support member such that the first elongate compression member can rotate relative to the outer support member, and the second end of the first elongate compression member is coupled to the inner support member such that the first elongate compression member can rotate relative to the inner support member.

8. The apparatus of claim 1, wherein the elongate tension member is a first elongate tension member, the structure for an electromagnetic machine further including a second elongate tension member, a first transverse compression member and a second transverse compression member, the first end portion of the first elongate tension member coupled to the first compression member at a first location on the first elongate compression member, the second elongate tension member having a first end portion coupled to the first elongate compression member at a second location different than the first location and a second end portion coupled to one of the inner support member and the second elongate compression member, the first transverse compression member coupled to the first elongate tension member and coupled to the first elongate compression member such that a length of the second transverse compression member extends substantially perpendicular to a length of the first elongate compression member, the second transverse compression member coupled to the second elongate tension member and coupled to the first elongate compression member such that a length of the second transverse compression member extends substantially perpendicular to a length of the first elongate compression member, the length of the first transverse compression member being greater than the length of the second transverse compression member, the first transverse compression member and the second transverse compression member collectively providing increased resistance to buckling of the first compression member.

9. An apparatus, comprising:
a structure for an electromagnetic machine including:
an outer support member configured to support one of a conductive winding or a magnet;
an inner support member having an axial width;
an elongate compression member;
a first elongate tension member; and
a second elongate tension member,
the elongate compression member having a first end coupled to the outer support member and a second end coupled to the inner support member at a first location along the axial width of the inner support member,
the first elongate tension member having a first end portion coupled to a portion of the compression member and a second end portion coupled to the inner support member at a second location along the axial width of the inner support member different than the first location along the axial width of the inner support member,
the first elongate tension member configured to resist axial deflection of the outer support member relative to the inner support member,
the second elongate tension member having a first end portion coupled to the elongate compression member and a second end portion coupled to the inner support member at a third location along the axial width of the inner support member,
the second elongate tension member configured to resist axial deflection of the outer support member relative to the inner support member.

10. The apparatus of claim 9, wherein the second location along the axial width of the inner support member is between the first location along the axial width of the inner support member and the third location along the axial width of the inner support member.

11. The apparatus of claim 9, wherein the first elongate tension member configured to resist axial deflection of the outer support member relative to the inner support member in a first axial direction, the second elongate tension member configured to resist axial deflection of the outer support member relative to the inner support member in a second axial direction, opposite the first axial direction.

12. The apparatus of claim 9, further comprising:
a transverse compression member coupled to the first elongate tension member and coupled to the compression member such that a length of the transverse compression member extends at an angle relative to a length of the elongate compression member, the transverse compression member providing increased resistance to buckling of the elongate compression member.

13. The apparatus of claim 9, wherein the structure for an electromagnetic machine includes a first transverse compression member and a second transverse compression member,
the first transverse compression member coupled to the first elongate tension member and coupled to the elongate compression member such that a length of the second transverse compression member extends at an angle relative to a length of the elongate compression member,
a second transverse compression member coupled to the second elongate tension member and coupled to the elongate compression member such that a length of the second transverse compression member extends at an angle relative to a length of the elongate compression member, the first transverse compression member and the second transverse compression member collectively providing increased resistance to buckling of the first compression member.

14. The apparatus of claim 9, wherein:
the first end of the compression member is coupled to the outer support member such that the elongate compression member can rotate relative to the outer support member, and
the second end of the compression member is coupled to the inner support member such that the elongate compression member can rotate relative to the inner support member.

15. The apparatus of claim 9, wherein each of the first elongate tension member and the second elongate tension member is under tension and applies a compressive force to the first elongate compression member when the structure for an electromagnetic machine is in an unloaded state.

16. The apparatus of claim 9, wherein the structure for an electromagnetic machine further including a first transverse compression member and a second transverse compression member,
the first transverse compression member coupled to the first elongate tension member and coupled to the first elongate compression member such that a length of the second transverse compression member extends substantially perpendicular to a length of the first elongate compression member,
the second transverse compression member coupled to the second elongate tension member and coupled to the first elongate compression member such that a length of the second transverse compression member extends substantially perpendicular to a length of the first elongate compression member,
the length of the first transverse compression member being greater than the length of the second transverse compression member, the first transverse compression member and the second transverse compression member collectively providing increased resistance to buckling of the first compression member.

17. A kit, comprising:
an outer support member segment configured to support one of a conductive winding or a magnet;
an inner support member;
a first elongate compression member having a first end configured to be coupled to the outer support member segment and a second end configured to be coupled to the inner support member;
a first elongate tension member having a first end portion configured to be coupled to a portion of the compression member and a second end portion configured to be coupled to at least one of the inner support member and a second elongate compression member; and
a second elongate tension member having a first end portion configured to be coupled to the first elongate compression member and a second end portion configured to be coupled to one of the inner support member and a third elongate compression member,
the outer support member segment, the inner support member, the elongate compression member, the first elongate tension member and the second elongate tension member each configured to be disposed within a structure for an electromagnetic machine,
the first elongate tension member configured to resist rotational deflection of the outer support member segment relative to the inner support member in a first rotational direction when coupled thereto, the second elongate tension member configured to resist rotational deflection of the outer support member segment relative to the inner support member in a second rotational direction, opposite the first rotational direction, when coupled thereto.

18. The kit of claim 7, wherein the first elongate tension member is configured to be coupled to the first elongate compression member at a first location on the first elongate compression member, the kit further comprising:
the second elongate compression member;
the second elongate tension member configured to be coupled to the first elongate compression member at a second location on the first elongate compression member different than the first location, the second elongate tension member configured to resist axial deflection of the outer support member segment relative to the inner support member when coupled thereto,
the second elongate compression configured to be disposed within the structure for an electromagnetic machine.

19. The kit of claim 17, further comprising:
a transverse compression member configured to be coupled to the first elongate tension member and the first elongate compression member such that a length of the transverse compression member extends substantially perpendicular to a length of the first elongate compression member, the transverse compression member providing increased resistance to buckling of the first compression member when coupled thereto.

20. The kit of claim 17, the kit further including a first transverse compression member and a second transverse compression member,
the first transverse compression member configured to be coupled to the first elongate tension member and the first elongate compression member such that a length of the first transverse compression member extends at an angle relative to a length of the first elongate compression member,
the second transverse compression member configured to be coupled to the second elongate tension member and the first elongate compression member such that a length of the second transverse compression member extends at an angle relative to a length of the first elongate compression member, the first transverse compression member and the second transverse compression member collectively providing increased resistance to buckling of the first compression member.

21. The kit of claim 17, wherein the kit further includes a first transverse compression member and a second transverse compression member, the first end portion of the first elongate tension member configured to be coupled to the first compression member at a first location on the first compression member, the first end portion of the second elongate tension member configured to be coupled to the first elongate compression member at a second location different than the first location, the first transverse compression member configured to be coupled to the first elongate tension member and the first elongate compression member such that a length of the second transverse compression member extends at an angle relative to a length of the first elongate compression member, the second transverse compression member configured to be coupled to the second elongate tension member and the first elongate compression member such that a length of the second transverse compression member extends substantially at an angle relative to a length of the first elongate compression member, the length of the first transverse compression member being greater than the length of the second transverse compression member, the first transverse compression member and the second transverse compression member collectively providing increased resistance to buckling of the first compression member.

* * * * *